US011332552B2

(12) United States Patent
Small et al.

(10) Patent No.: US 11,332,552 B2
(45) Date of Patent: May 17, 2022

(54) LOW PRESSURE PROCESS FOR PREPARING LOW-DENSITY POLYETHYLENE

(71) Applicant: Chevron Phillips Chemical Company LP, The Woodlands, TX (US)

(72) Inventors: Brooke L. Small, Kingwood, TX (US); Lauren M. Kattchee, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 68 days.

(21) Appl. No.: 15/598,573

(22) Filed: May 18, 2017

(65) Prior Publication Data
US 2017/0335022 A1 Nov. 23, 2017

Related U.S. Application Data

(60) Provisional application No. 62/339,154, filed on May 20, 2016.

(51) Int. Cl.
| C08F 10/06 | (2006.01) |
| C08F 4/42 | (2006.01) |
| C08F 110/02 | (2006.01) |
| C08F 2/06 | (2006.01) |
| C08F 2/44 | (2006.01) |
| C08F 4/70 | (2006.01) |
| C08K 3/08 | (2006.01) |

(52) U.S. Cl.
CPC .......... *C08F 4/42* (2013.01); *C08F 2/06* (2013.01); *C08F 2/44* (2013.01); *C08F 4/70* (2013.01); *C08F 4/7095* (2013.01); *C08F 4/7098* (2013.01); *C08F 110/02* (2013.01); *C08K 3/08* (2013.01); *C08K 2003/0812* (2013.01); *C08K 2003/0893* (2013.01)

(58) Field of Classification Search
None
See application file for complete search history.

(56) References Cited

U.S. PATENT DOCUMENTS

| 3,242,099 | A | | 3/1966 | Manyik et al. | |
| 3,794,558 | A | * | 2/1974 | Back | D21H 17/29 162/175 |
| 4,794,096 | A | | 12/1988 | Ewen | |
| 4,808,561 | A | | 2/1989 | Wellborn, Jr. | |
| 5,576,259 | A | | 11/1996 | Hasegawa et al. | |
| 5,807,938 | A | | 9/1998 | Kaneko et al. | |
| 5,919,983 | A | | 7/1999 | Rosen et al. | |
| 6,107,230 | A | | 8/2000 | McDaniel et al. | |
| 6,127,497 | A | * | 10/2000 | Matsunaga | B01J 31/143 502/123 |
| 6,150,295 | A | | 11/2000 | Eilerts | |
| 6,165,929 | A | | 12/2000 | McDaniel et al. | |
| 6,291,608 | B1 | | 9/2001 | Eilerts et al. | |
| 6,294,494 | B1 | | 9/2001 | McDaniel et al. | |
| 6,300,271 | B1 | | 10/2001 | McDaniel et al. | |
| 6,300,451 | B1 | | 10/2001 | Mehta et al. | |
| 6,306,986 | B1 | | 10/2001 | Teasley | |
| 6,316,553 | B1 | | 11/2001 | McDaniel et al. | |
| 6,355,594 | B1 | | 3/2002 | McDaniel et al. | |
| 6,376,415 | B1 | | 4/2002 | McDaniel et al. | |
| 6,391,816 | B1 | | 5/2002 | McDaniel et al. | |
| 6,395,666 | B1 | | 5/2002 | McDaniel et al. | |
| 6,524,987 | B1 | | 2/2003 | Collins et al. | |
| 6,548,441 | B1 | | 4/2003 | McDaniel et al. | |
| 6,750,302 | B1 | | 6/2004 | McDaniel et al. | |
| 6,831,141 | B2 | | 12/2004 | McDaniel et al. | |

(Continued)

FOREIGN PATENT DOCUMENTS

| EP | 0729978 A1 | 9/1996 |
| WO | 1996/023010 A2 | 8/1996 |

(Continued)

OTHER PUBLICATIONS

Liu et al. (Journal of Applied Polymer Science, 109, 700-707). (Year: 2008).*
International Search Report and Written Opinion for PCT/US2017/033356, dated Aug. 31, 2017 (13 pages).
Boehmite AIO (OH)—Handbook of Mineralogy Mineral Data Publishing, Version 1, 2005.
Cox et al., "Understanding Rheology of Thermoplastic Polymers," J. Polym. Sci., 1958, 28(118): 1-8.

(Continued)

*Primary Examiner* — Yun Qian
(74) *Attorney, Agent, or Firm* — Eversheds Sutherland (US) LLP

(57) ABSTRACT

Disclosed are catalyst systems, processes for making the catalyst systems, and processes for polymerizing at least one olefin monomer comprising ethylene to form a low-density polyethylene (LDPE). The polymerization process uses a catalyst system that can include: at least one diimine complex having the formula I:

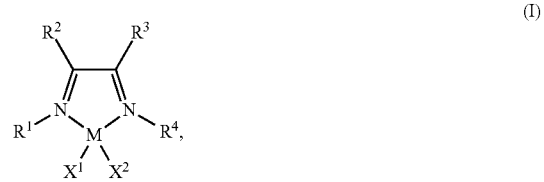

(I)

wherein M is Ni, Pd, or Pt; a first activator such as an organoaluminum compound; and a second activator including a solid oxide chemically-treated with an electron withdrawing anion, such as fluoride silica-alumuina. It was discovered that such the complexes could be activated in a manner to provide an active catalyst system that polymerized ethylene to form a low-density polyethylene (LDPE).

30 Claims, 13 Drawing Sheets

(56) References Cited

U.S. PATENT DOCUMENTS

| | | |
|---|---|---|
| 6,936,667 B2 | 8/2005 | Jensen et al. |
| 6,992,032 B2 | 1/2006 | McDaniel et al. |
| 7,026,494 B1 | 4/2006 | Yang et al. |
| 7,041,617 B2 | 5/2006 | Jensen et al. |
| 7,148,298 B2 | 12/2006 | Jensen et al. |
| 7,199,073 B2 | 4/2007 | Martin et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,348,388 B2 | 3/2008 | Ittel et al. |
| 7,470,758 B2 | 12/2008 | Jensen et al. |
| 7,501,372 B2 | 3/2009 | Thorn et al. |
| 7,517,939 B2 | 4/2009 | Yang et al. |
| 7,576,163 B2 | 8/2009 | Yang et al. |
| 7,601,665 B2 | 10/2009 | McDaniel et al. |
| 7,619,047 B2 | 11/2009 | Yang et al. |
| 7,629,284 B2 | 12/2009 | Jensen et al. |
| 7,884,163 B2 | 2/2011 | McDaniel et al. |
| 8,703,886 B1 | 4/2014 | Yang et al. |
| 8,871,878 B2 | 10/2014 | Collins et al. |
| 9,012,359 B2 | 4/2015 | Muron |
| 9,023,959 B2 | 5/2015 | McDaniel et al. |
| 9,181,366 B2 | 11/2015 | Sirol |
| 2002/0187892 A1 | 12/2002 | Preishuber-Pfluegl |
| 2006/0040822 A1 | 2/2006 | Shveima et al. |
| 2010/0076167 A1 | 3/2010 | McDaniel et al. |
| 2014/0323675 A1* | 10/2014 | Sirol ................ C08F 10/02 526/352 |

FOREIGN PATENT DOCUMENTS

| | | | |
|---|---|---|---|
| WO | 1999/032226 A1 | 7/1999 | |
| WO | 2007/146263 A2 | 12/2007 | |
| WO | 2012/098045 A1 | 7/2012 | |
| WO | WO-2012098045 A1 * | 7/2012 | ............. C08F 10/00 |

OTHER PUBLICATIONS

Jurkiewicz et al., "13C NMR Characterization of Short Chain Branches of Nickel Catalyzed Polyethylene," Macromolecules (1999) 32(17): 5471-5476.

Martienssen et al., "3.3 Polymers," Springer Handbook of Condensed Matter and Material Data, Springer, 2005, 477-485 (Section 3.3.3.1 only, Polyolefins).

Pasch et al., "Recent Advances in High-Temperature Fractionation of Polyolefins," Adv Polym Sci (2013) 251: 77-140.

Schrekker et al., "Efficient Slurry-Phase Homopolymerization of Ethylene to Branched Polyethylenes Using α-Diimine Nickel(II) Catalysts Covalently Linked to Silica Supports," Macromolecules 2006, 39, 6341-6354.

\* cited by examiner

LOW PRESSURE PROCESS FOR PREPARING LOW-DENSITY POLYETHYLENE

CROSS REFERENCE TO RELATED APPLICATIONS

This application claims the benefit of priority from U.S. Provisional Application No. 62/339,154, filed May 20, 2016, which is incorporated herein by reference in its entirety.

TECHNICAL FIELD OF THE INVENTION

This disclosure relates to low-density polyethylene and processes for the preparation of low-density polyethylene.

BACKGROUND OF THE INVENTION

Low-density polyethylene (LDPE) is a commercially important thermoplastic polymer produced by a free-radical polymerization of ethylene. The resulting polymer is useful across a wide range of applications. However, because LDPE production requires high ethylene pressures (≥30,000 psi), production costs and safety concerns are continuing concerns in LDPE plants.

As a result, there remains a need for new processes that might be effected under lower pressures and milder conditions. For example, new LDPE processes that could be carried out with lower capital costs, such as using in existing lower pressure reactor systems would be beneficial.

SUMMARY OF THE INVENTION

This disclosure provides for catalyst systems, processes for making the catalyst systems, and processes for polymerizing at least one olefin monomer comprising ethylene to form a low-density polyethylene (LDPE). In an aspect, for example, this disclosure demonstrates how to produce LDPE under substantially lower pressures and milder conditions than the standard conditions used to generate LDPE by the conventional free-radical process. According to a further aspect, the LDPE processes and catalyst system described herein can be used in reactors such as slurry reactors, loop-slurry reactors, gas phase reactors, and the like.

In the course of examining nickel diimine-type complexes and catalysts, it was discovered that the complexes could be activated in a manner to provide an active catalyst system that polymerized ethylene, and generally an olefin monomer composition comprising ethylene, to form a low-density polyethylene (LDPE). The catalyst system design and the method activating the transition metal catalyst allowed ethylene to be polymerized under extremely mild reaction conditions, for example, from about 50° C. to about 120° C. and using ethylene pressures from about 100 psig to about 1000 psig (about 1.4 to about 6.9 MPa).

According to an aspect of this disclosure, for example, there is provided a process for polymerizing an olefin, the process comprising:

a) providing a catalyst system comprising the contact product of:

1) one or more transition metal compounds, each having a formula according to formula (I):

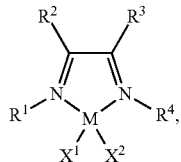

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof; and 3) a second activator comprising a solid oxide chemically-treated with an electron withdrawing anion; and b) contacting the catalyst system with at least one olefin monomer comprising ethylene under polymerization conditions suitable to form a polyethylene.

Further aspects of this disclosure provide, for example, a process for forming a catalyst system, the process comprising contacting in any order to form a catalyst system:

1) one or more transition metal compounds, each having a formula according to formula (I):

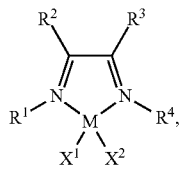

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof;

3) a second activator comprising a solid oxide chemically-treated with an electron withdrawing anion; and 4) optionally, at least one olefin monomer comprising ethylene.

Additional aspects of this disclosure are set out hereinbelow, for example, there is provided a catalyst system, the catalyst system comprising the contact product of:
1) one or more transition metal compounds, each having a formula according to formula (I):

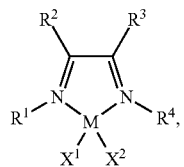

(I)

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;
2) a first activator comprising an organoaluminum compound, an organozinc compound, an organomagnesium compound, an organolithium compound, an organoboron or organoborate compound, an ionizing ionic compound, an aluminoxane compound, or any combination thereof; and
3) a second activator comprising a solid oxide chemically-treated with an electron withdrawing anion.

This disclosure further describe fabricating an article of manufacture comprising the olefin polymer produced according to the disclosure, by any technique. The fabricated article can be, for example, an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

These and other embodiments and aspects of the processes and catalyst system are described more fully in the Detailed Description and claims and further disclosure such as the Examples provided herein.

DETAILED DESCRIPTION OF THE INVENTION

General Description

Figure 1:
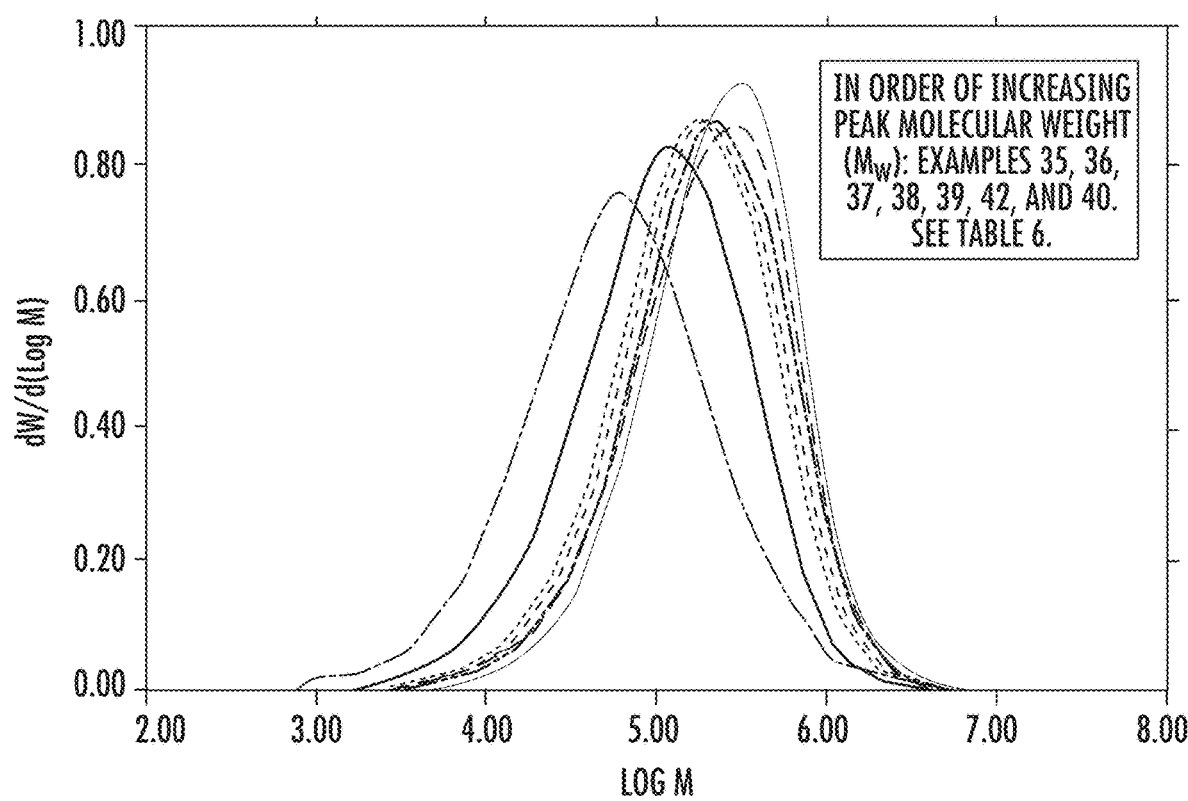
FIG. 1 presents GPC traces showing the molecular weight distribution for LDPE polymer samples according to this disclosure, with Examples 35-39, 42 and 40, respectively, shown in order of increasing peak molecular weight. Sample identification is correlated to Table 1 and Table 4.

This disclosure provides generally for catalytic processes for polymerizing ethylene to form a low-density polyethylene (LDPE), processes for making the subject catalyst, and generally the catalyst itself. It has been discovered that using the disclosed catalysts system and methods, LDPE can be produced using substantially lower pressures and milder conditions than the standard conditions used to form LDPE by the conventional free-radical process. This discovery allows for traditional high-pressure LDPE reactor methods to be replaced by LDPE processes carried out in low pressure reactors such as slurry reactors, loop-slurry reactors, gas phase reactors, and the like. The subject catalyst systems include certain nickel diimine-type complexes that are activated with a combination of a first activator such as an alkylation agent (for example, an organoaluminum compound) or a ionizing ionic compound, and a second activator that includes a chemically-treated solid oxide, that is, a solid oxide material that is treated or contacted with an electron withdrawing anion.

As an example of the first activator, the first activator can comprise, consist essentially of, consist of, or be selected from an organoaluminum compound, an organozinc compound, an organomagnesium compound, an organolithium compound, an organoboron or organoborate compound, an ionizing ionic compound, an aluminoxane compound, or any combination thereof. These agents traditionally have been referred to as co-catalysts, and can include, for example, alkylating agents and compounds that can function as Lewis acids and interact with the transition metal catalyst to form a cationic complex or incipient cationic complex.

The chemically-treated solid oxide second activator that is particularly useful is fully described herein. A solid oxide that has been chemically-treated with an electron withdrawing anion may also be referred to throughout this disclosure as a chemically treated solid oxide (CTSO), a solid super acid (SSA), or an activator-support, and these terms are used interchangeably. Examples of the solid oxide that can be used to prepare the chemically-treated solid oxide include, but are not limited to, silica, alumina, silica-alumina, aluminum phosphate, mullite, boehmite, heteropolytungstates, titania, zirconia, magnesia, boria, zinc oxide, silica-zirconia, silica-titania, or any combination thereof. Examples of the electron withdrawing anion and the source for the electron withdrawing anion may that can be used to prepare the chemically-treated solid oxide include, but are not limited to, fluoride, chloride, bromide, phosphate, triflate, sulfate, bisulfate, fluorophosphate, fluorosulfate, or any combination thereof.

Each of the catalyst system components and processes for making and using the catalyst system for polymerizing olefins is fully described herein. Definitions of terms that are used in this disclosure are set out.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst system preparation consisting of specific steps but utilize a catalyst system comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "an organoaluminum compound" is meant to encompass one organoaluminum compound, or mixtures or combinations of more than one organoaluminum compound unless otherwise specified.

The terms "configured for use" or "adapted for use" and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

Groups of elements of the table are indicated using the numbering scheme indicated in the version of the periodic table of elements published in *Chemical and Engineering News,* 63(5), 27, 1985. In some instances a group of elements may be indicated using a common name assigned to the group; for example alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Many groups are specified according to the atom that is bonded to the metal or bonded to another chemical moiety as a substituent, such as an "oxygen-bonded group," which is also called an "oxygen group." For example, an oxygen-bonded group includes species such as hydrocarbyloxide (—OR where R is a hydrocarbyl group, also termed hydrocarboxy), alkoxide (—OR where R is an alkyl group), aryloxide (—OAr where Ar is an aryl group), or substituted analogs thereof, which function as ligands or substituents in the specified location. Also, unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence of absence of a branched underlying structure or backbone.

Similarly, another representative example follows for the number-average molecular weight (Mn) of an olefin polymer produced in an aspect of this invention. By a disclosure that the Mn can be in a range from about 60,000 to about 75,000 g/mol, Applicants intend to recite that the Mn can be equal to about 60,000, about 61,000, about 62,000, about 63,000, about 64,000, about 65,000, about 66,000, about 67,000, about 68,000, about 69,000, about 70,000, about 71,000, about 72,000, about 73,000, about 74,000, or about 75,000 g/mol. Additionally, the Mn can be within any or sub-range from about 60,000 to about 75,000 (for example, from about 60,000 to about 65,000), and this also includes any combination of ranges between about 60,000 to about 75,000 (for example, the Mn can be in a range from about 60,000 to about 65,000, and/or from about 68,000 to about 72,000) Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. For example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") of hydrogen atoms from a parent compound, which in this example can be described as an "alkane group," and which encompasses an "alkyl group," an "alkylene group," and materials have three or more hydrogen atoms, as necessary for the situation, removed from the alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon).

The term "hydrocarbyl" group is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. The term "hydrocarbylene" group as used herein is slightly expanded beyond the IUPAC definition of hydrocarbylene. As used herein, a "hydrocarbylene" group refer to a divalent group formed by removing two hydrogen atoms from a hydrocarbon or a substituted hydrocarbon, the free valencies of which are not engaged in increasing the carbon-carbon bond order, for example, are not engaged in forming a double bond or triple bond. By way of example and comparison, examples of hydrocarbyl and hydrocarbylene groups include, respectively: aryl and arylene; alkyl and alkylene; cycloalkyl and cycloalkylene; aralkyl and aralkylene; and so forth. Examples of hydrocarbylene groups include but are not limited to: 1,2-phenylene; 1,3-phenylene; 1,2-propandiyl; 1,3-propandiyl; 1,2-ethandiyl; 1,4-butandiyl; 2,3-butandiyl; and methylene.

An "aliphatic" compound is a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic and/or linear or branched unless otherwise specified. Primary, secondary, and tertiary alkyl groups are derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ (R≠H), $R_2CH$ (R≠H), and $R_3C$ (R≠H) are primary, secondary, and tertiary alkyl groups, respectively.

The term "carbocyclic" group is used herein to refer to a univalent group formed by removing a hydrogen atom from a carbocyclic compound, that is, a cyclic compound in which all the ring members are carbon atoms. Non-limiting examples of carbocyclic groups include, for example, cyclopentyl, cyclohexyl, phenyl, tolyl, naphthyl and the like.

A "cycloalkane" is a saturated cyclic hydrocarbon, with or without side chains, for example, cyclobutane. Other identifiers can be utilized to indicate the presence of particular groups in the cycloalkane (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth. A "cycloalkyl group" is a univalent group derived by removing a hydrogen atom from a ring carbon atom from a cycloalkane. Examples of cycloalkyl groups include cyclobutyl, cyclopentyl, cyclohexyl, and cycloheptyl groups. For clarity, other examples of cycloalkyl groups include a 1-methylcyclopropyl group and a 2-methylcyclopropyl group are illustrated as follows.

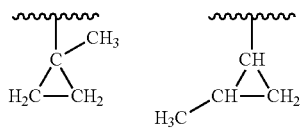

A "cycloalkane group" refers to a generalized group formed by removing one or more hydrogen atoms (as necessary for the particular group and at least one of which is a ring carbon) from a cycloalkane.

The term "alkene" whenever used in this specification and claims refers to an olefin that has at least one carbon-carbon double bond. The term "alkene" includes aliphatic or aromatic, cyclic or acyclic, and/or linear and branched alkene unless expressly stated otherwise. The term "alkene," by itself, does not indicate the presence or absence of heteroatoms and/or the presence or absence of other carbon-carbon double bonds unless explicitly indicated. Other identifiers may be utilized to indicate the presence or absence of particular groups within an alkene. Alkenes may also be further identified by the position of the carbon-carbon double bond. Alkenes, having more than one such multiple bond are alkadienes, alkatrienes, and so forth, and may be further identified by the position of the carbon-carbon double bond.

An "alkenyl group" is a univalent group derived from an alkene by removal of a hydrogen atom from any carbon atom of the alkene. Thus, "alkenyl group" includes groups in which the hydrogen atom is formally removed from an $sp^2$ hybridized (olefinic) carbon atom and groups in which the hydrogen atom is formally removed from any other carbon atom. For example and unless otherwise specified, 1-propenyl (—CH=$CHCH_3$), 2-propenyl [$(CH_3)C=CH_2$], and 3-propenyl (—$CH_2CH=CH_2$) groups are all encompassed with the term "alkenyl group." Other identifiers may be utilized to indicate the presence or absence of particular groups within an alkene group. Alkene groups may also be further identified by the position of the carbon-carbon double bond.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

An "aromatic group" refers to a generalized group formed by removing one or more hydrogen atoms (as necessary for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms by trivalent or divalent heteroatoms, in such a way as to maintain the continuous pi-electron system characteristic of aromatic systems and a number of out-of-plane pi-electrons corresponding to the Hückel rule (4n+2)). While arene compounds and heteroarene compounds are mutually exclusive members of the group of aromatic compounds, a compound that has both an arene group and a heteroarene group that compound generally is considered a heteroarene compound. Aromatic compounds, arenes, and heteroarenes may be mono- or polycyclic unless otherwise specified. Examples of arenes include, but are not limited to, benzene, naphthalene, and toluene, among others. Examples of heteroarenes include, but are not limited to, furan, pyridine, and methylpyridine, among others. As disclosed herein, the term "substituted" may be used to describe an aromatic group wherein any non-hydrogen moiety formally replaces a hydrogen in that group, and is intended to be non-limiting.

An arene is an aromatic hydrocarbon, with or without side chains (e.g., benzene, toluene, or xylene, among others). An "aryl group" is a group derived from the formal removal of a hydrogen atom from an aromatic hydrocarbon ring carbon atom from an arene compound. One example of an "aryl group" is ortho-tolyl (o-tolyl), the structure of which is shown here.

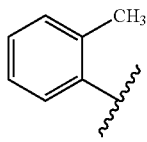 [SMILES: *c1ccccc1C]

The arene can contain a single aromatic hydrocarbon ring (e.g., benzene or toluene), contain fused aromatic rings (e.g., naphthalene or anthracene), and contain one or more isolated aromatic rings covalently linked via a bond (e.g., biphenyl) or non-aromatic hydrocarbon group(s) (e.g., diphenylmethane).

A "heterocyclic compound" is a cyclic compound having at least two different elements as ring member atoms. For example, heterocyclic compounds may comprise rings containing carbon and nitrogen (for example, tetrahydropyrrole), carbon and oxygen (for example, tetrahydrofuran), or carbon and sulfur (for example, tetrahydrothiophene), among others. Heterocyclic compounds and heterocyclic groups may be either aliphatic or aromatic.

An "aralkyl group" is an aryl-substituted alkyl group having a free valance at a non-aromatic carbon atom, for example, a benzyl group and a 2-phenylethyl group are examples of an "aralkyl" group.

A "halide" has its usual meaning. Examples of halides include fluoride, chloride, bromide, and iodide.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a transition metal component into an active catalyst that can polymerize olefins, or converting a contact product of a transition metal component and a component that provides an activatable ligand (e.g., an alkyl, a hydride) to the transition metal, when the transition metal compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds may be generally referred to as activators if used in a catalyst composition in which an activator-support is not present. If the catalyst composition contains an activator-support, then the aluminoxane, organoboron or organoborate, and ionizing ionic materials may be referred to as co-catalysts.

An "organoaluminum compound," is used to describe any compound that contains an aluminum-carbon bond. Thus, organoaluminum compounds include, but are not limited to, hydrocarbyl aluminum compounds such as trihydrocarbyl-, dihydrocarbyl-, or monohydrocarbylaluminum compounds; hydrocarbylaluminum halide compounds; hydrocarbylalumoxane compounds; and aluminate compounds which contain an aluminum-organyl bond such as tetrakis(p-tolyl) aluminate salts. An "organoboron" compound, an "organozinc compound," an "organomagnesium compound," and an "organolithium compound" are used in an analogous fashion to describe any compound that contains a direct metal-carbon bond between an organic group and the recited metal.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the transition metal compound(s), any olefin monomer used to prepare a pre-contacted mixture, or the activator (e.g., activator-support), after combining these components. Therefore, the terms "catalyst composition," "catalyst mixture." "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, allowed to react, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present invention is directed generally to new catalyst compositions, methods for preparing catalyst compositions, methods for using the catalyst compositions to polymerize olefins, the polymer resins produced using such catalyst compositions, and articles produced using these polymer resins.

In an aspect, there is disclosed a process for polymerizing an olefin, the process comprising:
a) providing a catalyst system comprising the contact product of:
1) one or more transition metal compounds, each having a formula according to formula (I):

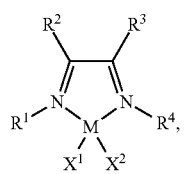

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;
2) a first activator comprising an organoaluminum compound, an organozinc compound, an organomagnesium compound, an organolithium compound, an organoboron or organoborate compound, an ionizing ionic compound, an aluminoxane compound, or any combination thereof; and
3) a second activator comprising a solid oxide chemically-treated with an electron withdrawing anion; and
b) contacting the catalyst system with at least one olefin monomer comprising ethylene under polymerization conditions suitable to form a polyethylene.

This disclosure also provides a process for forming catalysts system, the process comprising contacting in any order to form a catalyst system:
1) one or more transition metal compounds, each having a formula according to formula (I):

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;
2) a first activator comprising an organoaluminum compound, an organozinc compound, an organomagnesium compound, an organolithium compound, an organoboron or organoborate compound, an ionizing ionic compound, an aluminoxane compound, or any combination thereof;
3) a second activator comprising a solid oxide chemically-treated with an electron withdrawing anion; and
4) optionally, at least one olefin monomer comprising ethylene.

A further aspect of this disclosure provides for the catalyst system itself, the catalyst system comprising the contact product of:
1) one or more transition metal compounds, each having a formula according to formula (I):

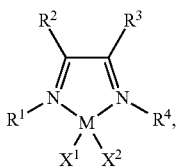

(I)

wherein
- M is Ni, Pd, or Pt;
- $X^1$ and $X^2$ are each independently a monoanionic ligand, or $X^1$ and $X^2$ taken together is a bidentate dianionic ligand;
- $R^1$ and $R^4$ are each independently $C_1$ to $C_{20}$ hydrocarbyl or substituted hydrocarbyl; and
- $R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof;

3) a second activator comprising a solid oxide chemically-treated with an electron withdrawing anion; and 4) optionally, at least one olefin monomer comprising ethylene.

Transition Metal Compound

The one or more transition metal compounds that constitute a component of the catalyst system disclosed herein independently have the general formula (I):

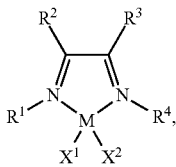

(I)

wherein
the transition metal M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

In an aspect, the nickel compounds according to formula I are particularly useful, but the palladium or platinum complexes can also be used in the catalyst systems and methods disclosed herein. Therefore, M of formula I can be Ni, Pd, and/or Pt.

The ligands coordinated to the transition metal M in the compound of formula I include $X^1$ and $X^2$, which can be monoionic ligands but can also be bidentate or multidentate dianionic ligands. For example, in the disclosed compound of formula I and the disclosed processes and catalyst system, $X^1$ and $X^2$ each can be independently halide, hydride, $C_1$ to $C_{20}$ hydrocarbyl or $C_1$ to $C_{20}$ hydrocarbyloxide, or $X^1$ and $X^2$ taken together is $C_1$ to $C_{20}$ hydrocarbylenedioxide. In another aspect, $X^1$ and $X^2$ each can be independently chloride, bromide, iodide, hydride, $C_1$ to $C_{20}$ hydrocarbyl, or $C_1$ to $C_{20}$ hydrocarbyloxide. Alternatively, $X^1$ and $X^2$ each can be independently chloride, bromide, hydride, or $C_1$-$C_4$ alkoxide. Alternatively still, $X^1$ and $X^2$ taken together can be lactate, glycolate, salicylate, catecholate, oxalate or malonate. The formula I compounds with $X^1$ and $X^2$ each being chloride are most commonly used.

The ligands coordinated to the transition metal M in the compound of formula I also include the diimine ligands represented by the general formula:

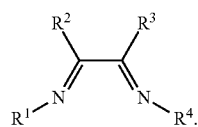

In this formula, the substituents $R^1$ and $R^4$ each can be independently $C_1$ to $C_{20}$ hydrocarbyl or substituted hydrocarbyl. The substituents $R^2$ and $R^3$ each can be independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring. For example $R^2$ and $R^3$ each can be independently $C_2$ to $C_{20}$ hydrocarbyl or substituted hydrocarbyl, $C_3$ to $C_{18}$ hydrocarbyl or substituted hydrocarbyl, $C_4$ to $C_{16}$ hydrocarbyl or substituted hydrocarbyl, $C_5$ to $C_{14}$ hydrocarbyl or substituted hydrocarbyl, or $C_6$ to $C_{12}$ hydrocarbyl or substituted hydrocarbyl. In another example, $R^2$ and $R^3$ taken together can form a carbocyclic ring as a $C_2$ to $C_{20}$ hydrocarbylene or substituted hydrocarbylene, a $C_4$ to $C_{20}$ hydrocarbylene or substituted hydrocarbylene, a $C_6$ to $C_{20}$ hydrocarbylene or substituted hydrocarbylene, or a $C_{10}$ to $C_{20}$ hydrocarbylene or substituted hydrocarbylene. Therefore, in a compound of formula I, $R^1$ and $R^4$ can be different or alternatively, $R^1$ and $R^4$ can be the same.

By way of example of the substituents $R^1$ and $R^4$, $R^1$ and $R^4$ also can be independently an aryl or substituted aryl. For example, $R^1$ and $R^4$ can each independently be a 2,6-disubstituted aryl or a 2,4,6-trisubstituted aryl, and wherein any substituent is independently a $C_1$ to $C_{12}$ hydrocarbyl. Specific examples of $R^1$ and $R^4$ include, independently, phenyl, 2,4,6-trimethylphenyl (mesityl), 2,6-diethylphenyl, 2,6-diisopropylphenyl, 2-ethyl-6-methylphenyl, 2-isopropyl-6-methylphenyl, 2-isopropyl-6-ethylphenyl, 2-methylphenyl, 2-ethylphenyl, 2-isopropylphenyl, 2,6-diisopropyl-4-benzylphenyl, 2,6-diisopropyl-4-(1,1-dimethylbenzyl)phenyl, 4-methylphenyl, or 2-t-butylphenyl.

Also by way of example of the substituents $R^2$ and $R^3$, $R^2$ and $R^3$ also can be independently hydrogen or $C_1$ to $C_{20}$ hydrocarbyl or substituted hydrocarbyl. For example, $R^2$ and $R^3$ each can be independently hydrogen, methyl, ethyl, or an aryl or substituted aryl. In an aspect and in various embodiments, $R^2$ and $R^3$ taken together can be a $C_2$ to $C_{20}$ hydrocarbylene or substituted hydrocarbylene to form a carbocyclic ring. For example, $R^2$ and $R^3$ taken together can be a $C_{10}$ hydrocarbylene group having the following formula:

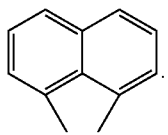

In some aspects, the transition metal complex in formula I can also include diimine ligands represented by the following formulas:

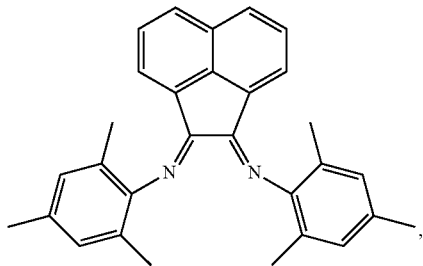

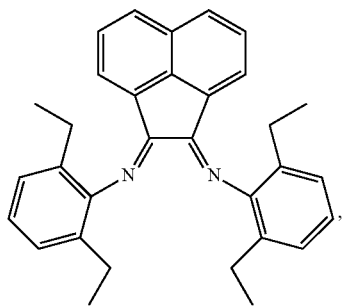

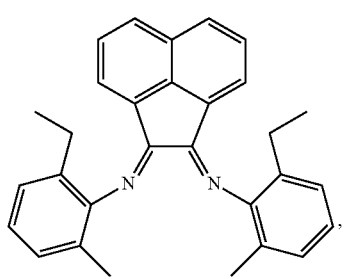

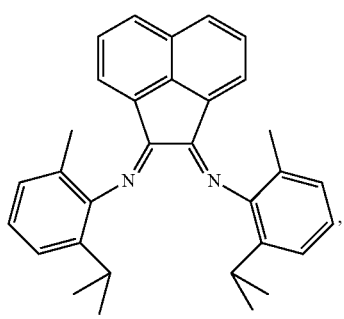

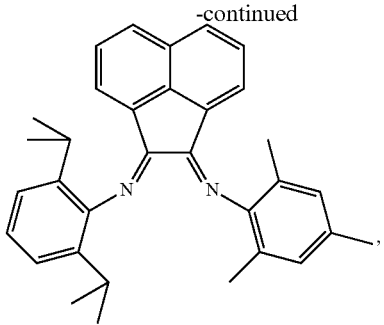

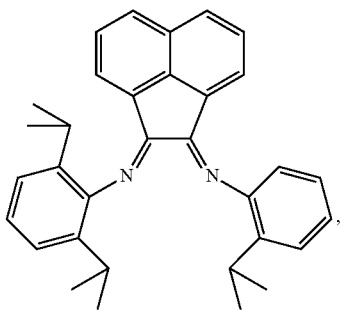

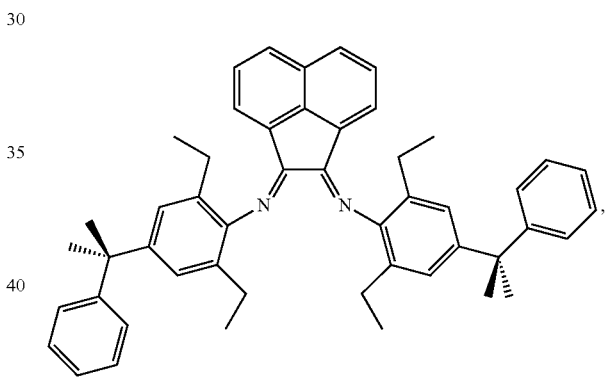

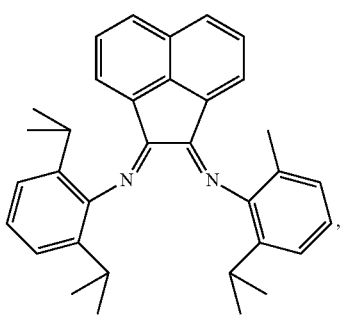

including a combination of any of these, which can be used to form a mixture of transition metal complexes having various combinations of these ligands.

Accordingly, in an aspect, the catalyst system and processes disclosed herein can employ any of the following transition metal compounds, including combinations of these compounds:

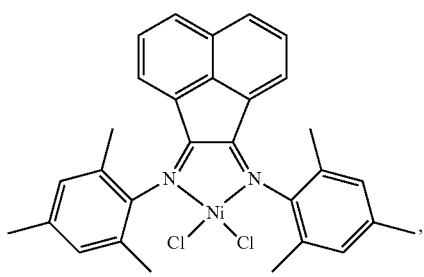

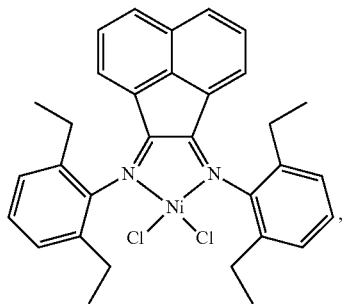

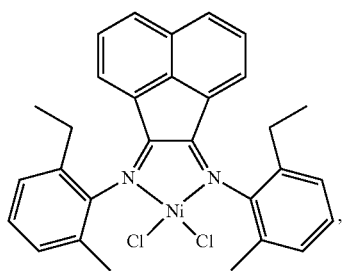

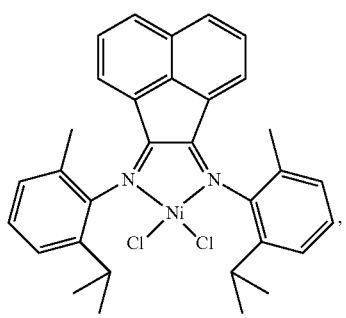

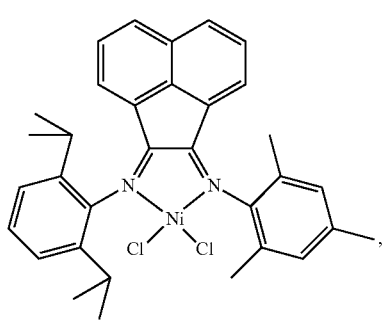

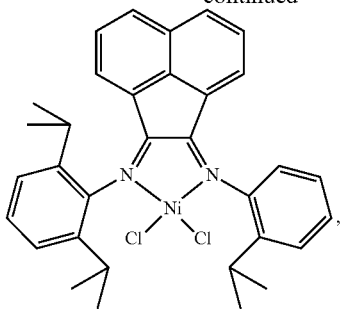

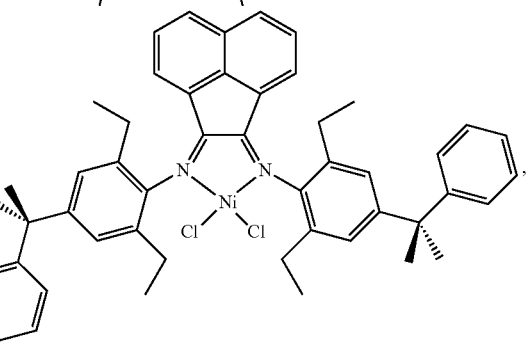

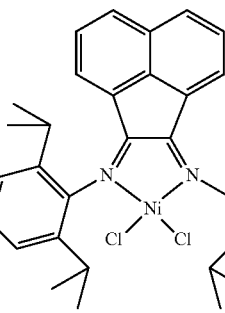

or any combination thereof.

Similar palladium and platinum compounds having the diimine ligands disclosed herein are also useful in the process to prepare linear low density polyethylene. Specifically, palladium and platinum compounds having the general formula:

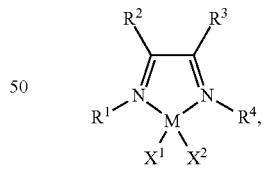

wherein M is Pd or Pt, and the substituents $X^1$, $X^2$, $R^1$, $R^2$, $R^3$, and $R^4$ as disclosed herein can be used. These palladium and platinum compounds can be prepared by a method that is analogous to the corresponding nickel complexes. For example, complexes of the general formula $L_2M'Cl_2$, wherein M' is palladium or platinum and L is a neutral ligand or $L_2$ is a neutral bidentate ligand, can be contacted with the diimine ligands such as those of Example 1-9, to generate the complexes of formula I, wherein M is Pd or Pt.

First Activator

The catalyst system and the processes disclosed herein use a first activator, not necessarily meaning first to be combined with the transition metal compound, but first with respect to identification only. For example, in an aspect, the first activator can comprise an organoaluminum compound, an organozinc compound, an organomagnesium compound, an organolithium compound, an organoboron or organoborate compound, an ionizing ionic compound, an aluminoxane compound, or any combination thereof. Examples of the kinds of organometallic compounds that can be a first activator include, but are not limited to, compounds a) $M^1(X^3)_n(X^4)_{3-n}$, wherein $M^1$ is boron or aluminum and n is from 1 to 3 inclusive;

b) $M^2(X^3)_n(X^4)_{2-n}$, wherein $M^2$ is magnesium or zinc and n is from 1 to 2 inclusive; and/or c) $M^3X^3$, wherein $M^3$ is Li;

wherein i) $X^3$ is independently hydride or a $C_1$ to $C_{20}$ hydrocarbyl; and ii) $X^4$ is independently a halide, a hydride, a $C_1$ to $C_{20}$ hydrocarbyl, or a $C_1$ to $C_{20}$ hydrocarbyloxide.

For example, the first activator can comprise any organoaluminum compound having a formula $Al(X^3)_n(X^4)_{3-n}$, wherein $X^3$ is independently a $C_1$ to $C_{20}$ hydrocarbyl, $X^4$ is independently a halide, a hydride, or a $C_1$ to $C_{20}$ hydrocarboxide, and n is from 1 to 3 inclusive.

In an aspect, the first activator can comprise or can be selected from an organoaluminum compound, wherein the organoaluminum compound can comprise, can consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

In a further aspect, the catalyst system and/or the reaction mixture to prepare and use the catalyst system can be substantially free of aluminoxane compounds, organoboron or organoborate compounds, ionizing ionic compounds, or combinations thereof. That is, "substantially free" is used to indicated that none of the recited compounds is intentionally added into the catalyst system or reaction system. In another aspect, the catalyst system and/or the reaction mixture to prepare and use the catalyst system can be substantially free of aluminoxane compounds. In another aspect, the first activator can comprise, consist essentially of, or be selected from an aluminoxane compound.

Each of the compounds that can constitute a first activator are described in more detail, as set out below.

Organoaluminum Compounds

One aspect of this disclosure provides for a method of producing an olefin polymer composition comprising contacting an olefin and a catalyst system, wherein the catalyst system can comprise a transition metal compound and an activator. In any embodiment provided here, the activator can comprise a solid oxide chemically-treated with an electron withdrawing anion. In a further aspect of any embodiment provided here, the catalyst system can comprise, either in combination with the chemically-treated solid oxide or any other activators(s) or alone, at least one organoaluminum compound. Organoaluminum compounds that can be used in the catalyst system of this disclosure include but are not limited to compounds having the formula:

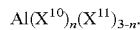

In an embodiment, each $X^{10}$ can be independently a $C_1$ to $C_{20}$ hydrocarbyl; alternatively, a $C_1$ to $C_{10}$ hydrocarbyl; alternately, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, a $C_1$ to $C_5$ alkyl. In an embodiment, each $X^{11}$ can be independently a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; alternatively, a halide, a hydride, or, or a $C_1$ to $C_5$ alkoxide. In an embodiment, n can be a number (whole or otherwise) from 1 to 3, inclusive. In another aspect and in any embodiment, organoaluminum compounds that can be used in the catalyst system of this disclosure include but are not limited to compounds having the formula:

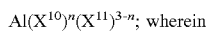

$X^{10}$ can be a hydrocarbyl having from 1 to about 20 carbon atoms;

$X^{11}$ can be selected from alkoxide or aryloxide, any one of which having from 1 to about 20 carbon atoms, halide, or hydride; and n can be a number (whole or otherwise) from 1 to 3, inclusive.

In one aspect of the formula $Al(X10)_n(X^{11})_{3-n}$, $X^{10}$ can be an alkyl having from 1 to about 10 carbon atoms. Examples of $X^{10}$ alkyl group are described herein and may be utilized to describe the alkyl aluminum compounds without limitation. In an aspect, $X^{11}$ may be independently selected from fluoro or chloro. In yet another aspect, $X^{11}$ may be chloro.

In the formula $Al(X^{10})_n(X^{11})_{3-n}$, n can be a number (whole or otherwise) from 1 to 3 inclusive, and typically, n is 2 or n is 3. The value of n is not restricted to be an integer, therefore this formula includes sesquihalide compounds or other organoaluminum cluster compounds.

Generally, examples of organoaluminum compounds that can be used in this disclosure include, but are not limited to, trialkylaluminum compounds, dialkylaluminium halide compounds, alkylaluminum dihalide compounds, dialkylaluminum alkoxide compounds, dialkylaluminum hydride compounds, and combinations thereof. Specific examples of organoaluminum compounds that are useful in this disclosure include, but are not limited to: trimethylaluminum (TMA), triethylaluminum (TEA), ethylaluminum dichloride, tripropylaluminum, diethylaluminum ethoxide, tributylaluminum, disobutylaluminum hydride, triisobutylaluminum, diethylaluminum chloride (DEAC), and combinations thereof.

In one aspect, the present disclosure provides for precontacting the transition metal compound with at least one organoaluminum compound and an olefin monomer to form a precontacted mixture, prior to contact this precontacted mixture with the solid oxide activator-support to form the active catalyst. When the catalyst system is prepared in this manner, typically, though not necessarily, a portion of the organoaluminum compound can be added to the precontacted mixture and another portion of the organoaluminum compound can be added to the postcontacted mixture prepared when the precontacted mixture can be contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the oligomerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this disclosure.

In one aspect and in any embodiment disclosed herein, the molar ratio of the organoaluminum compound to the transition metal compound can be from 0.001:1 to 100,000:1. Alternatively and in any embodiment, the molar ratio of the organoaluminum compound to the transition metal compound can be from 0.01:1 to 10,000:1; alternatively from 0.1:1 to 100:1; alternatively, from 0.5:1 to 10:1; or alternatively, from 0.2:1 to 5:1.

Aluminoxane Compounds

In one aspect, this disclosure encompasses catalyst systems which may utilize an aluminoxane. Aluminoxanes are also referred to as poly(hydrocarbyl aluminum oxides), organoaluminoxanes, or alumoxanes.

Alumoxane compounds that can be used in the catalyst system of this disclosure include, but are not limited to, oligomeric compounds. The oligomeric aluminoxane compounds can comprise linear structures, cyclic, or cage structures, or mixtures of all three. Oligomeric aluminoxanes, whether oligomeric or polymeric compounds, have the repeating unit formula:

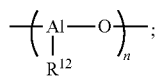

wherein $R^{12}$ is a linear or branched alkyl having from 1 to 10 carbon atoms, and n is an integer from 3 to about 10 are encompassed by this disclosure. Linear aluminoxanes having the formula:

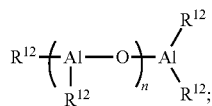

wherein $R^{12}$ is a linear or branched alkyl having from 1 to 10 carbon atoms, and n is an integer from 1 to about 50, are also encompassed by this disclosure.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)} - n_{O(2)} + n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Aluminoxanes that can serve as activators in this disclosure are generally represented by formulas such as $(R^{12}-Al-O)_n$, $R^{12}(R^{12}-Al-O)_nAl(R^{12})_2$, and the like, wherein the $R^{12}$ group is typically a linear or branched $C_1-C_6$ alkyl such as methyl, ethyl, propyl, butyl, pentyl, or hexyl wherein n typically represents an integer from 1 to about 50. In one embodiment, the aluminoxane compounds of this disclosure include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of "R" groups such as $R^{12}$ are encompassed by the present disclosure, methyl aluminoxane (MAO), ethyl aluminoxane, or isobutyl aluminoxane are typical aluminoxane activators used in the catalyst systems of this disclosure. These aluminoxanes are prepared from trimethylaluminum, triethylaluminum, or triisobutylaluminum, respectively, and are sometimes referred to as poly(methylaluminum oxide), poly(ethylaluminum oxide), and poly(isobutylaluminum oxide), respectively. It is also within the scope of the disclosure to use an aluminoxane in combination with a trialkylaluminum, such as disclosed in U.S. Pat. No. 4,794,096, which is herein incorporated by reference in its entirety.

The present disclosure contemplates many values of n in the aluminoxane formulas $(R^{12}-Al-O)_n$ and $R^{12}(R^{12}-Al-O)_nAl(R^{12})_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present disclosure.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this disclosure. Alternatively, organoaluminoxanes may be prepared by reacting an aluminum alkyl compound such as $AlR_3$ with a hydrated salt, such as hydrated copper sulfate, in an inert organic solvent.

The other catalyst components may be contacted with the aluminoxane in a saturated hydrocarbon compound solvent, though any solvent which is substantially inert to the reactants, intermediates, and products of the activation step can be used. The catalyst system formed in this manner may be collected by methods known to those of skill in the art, including but not limited to filtration, or the catalyst system may be introduced into the oligomerization reactor without being isolated.

Organozinc Compounds

As disclosed, one aspect of this disclosure provides for a method of producing an olefin polymer composition comprising contacting an olefin and a catalyst system, wherein the catalyst system can comprise a transition metal compound and an activator. In any embodiment provided here, the activator can comprise a solid oxide chemically-treated with an electron withdrawing anion. In a further aspect of any embodiment provided here, the catalyst system can comprise, either in combination with the chemically-treated solid oxide or any other activators(s) or alone, at least one organozinc compound. Organozinc compounds that can be used in the catalyst system of this disclosure include but are not limited to compounds having the formula:

In an embodiment, each $X^{12}$ is independently a $C_1$ to $C_{20}$ hydrocarbyl; alternatively, a $C_1$ to $C_{10}$ hydrocarbyl; alternatively, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, $C_1$ to $C_5$ alkyl. In an embodiment, each $X^{13}$ is independently a halide, a hydride, or a $C_1$ to $C_{20}$ hydrocarbyl; alternatively, a halide, a hydride, or a $C_1$ to $C_{10}$ hydrocarbyl; alternatively, a halide, a hydride, or a $C_6$ to $C_{20}$ aryl; alternatively, a halide, a hydride, or a $C_6$ to $C_{10}$ aryl; alternatively, a halide, a hydride, or a $C_1$ to $C_{20}$ alkyl; alternatively, a halide, a hydride, or a $C_1$ to $C_{10}$ alkyl; alternatively, a halide, a hydride, or a $C_1$ to $C_5$ alkyl; alternatively, a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; or alternatively, a halide, a hydride, or a $C_1$ to $C_5$ alkoxide.

In a further aspect and in any disclosed embodiment, the catalyst system can further comprise an organozinc activator, selected from a compound with the following formula:

$$ZnX^{12}X^{13};$$

wherein:

$X^{12}$ is a hydrocarbyl having from 1 to about 20 carbon atoms; and $X^{13}$ is selected from a hydrocarbyl, an alkoxide, or an aryloxide having from 1 to about 20 carbon atoms, halide, or hydride.

In another aspect, and in the various embodiments of this disclosure, useful organozinc compounds can be selected from or alternatively can comprise dimethylzinc, diethylzinc, dipropylzinc, dibutylzinc, dineopentylzinc, di(trimethylsilylmethyl)zinc, and the like, including any combinations thereof; alternatively, dimethylzinc; alternatively, diethylzinc; alternatively, dipropylzinc; alternatively, dibutylzinc; alternatively, dineopentylzinc; or alternatively, di(trimethylsilylmethyl)zinc.

In one aspect and in any embodiment disclosed herein, the molar ratio of the organozinc compound to the transition metal compound can be from 0.001:1 to 100,000:1. Alternatively and in any embodiment, the molar ratio of the organozinc compound to the transition metal compound can be from 0.01:1 to 10,000:1; alternatively from 0.1:1 to 100:1; alternatively, from 0.5:1 to 10:1; or alternatively, from 0.2:1 to 5:1.

Organoboron Compounds

Still a further aspect of this disclosure provides for a method of producing an olefin polymer composition comprising contacting an olefin and a catalyst system, wherein the catalyst system can comprise a transition metal compound and an activator. In any embodiment provided here, the activator can comprise a solid oxide chemically-treated with an electron withdrawing anion. In a further aspect of any embodiment provided here, the catalyst system can comprise, either in combination with the chemically-treated solid oxide or any other activators(s) or alone, at least one organoboron compound.

Organoboron compounds that can be used in the catalyst system of this disclosure are varied. In one aspect, the organoboron compound can comprise neutral boron compounds, borate salts, or combinations thereof. For example, the organoboron compounds of this disclosure can comprise a fluoroorgano boron compound, a fluoroorgano borate compound, or a combination thereof. Any fluoroorgano boron or fluoroorgano borate compound known in the art can be utilized. The term fluoroorgano boron compound has its usual meaning to refer to neutral compounds of the form $BY_3$. The term fluoroorgano borate compound also has its usual meaning to refer to the monoanionic salts of a fluoroorgano boron compound of the form [cation]$^+$[$BY_4$]$^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as activators in the present disclosure include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, including mixtures thereof; alternatively, N,N-dimethylanilinium tetrakis-(pentafluorophenyl)borate; alternatively, triphenylcarbenium tetrakis(pentafluorophenyl)borate; alternatively, lithium tetrakis(pentafluorophenyl)borate; alternatively, N,N-dimethylanilinium tetrakis[3,5-bis(trifluoromethyl)phenyl]borate; or alternatively, triphenylcarbenium tetrakis[3,5-bis(trifluoromethyl)phenyl]borate. Examples of fluoroorgano boron compounds that can be used as activators in the present disclosure include, but are not limited to, tris(pentafluorophenyl)-boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this disclosure. In one aspect and in any embodiment disclosed herein, the molar ratio of the organoboron compound to the transition metal compound can be from 0.001:1 to 100,000:1. Alternatively and in any embodiment, the molar ratio of the organoboron compound to the transition metal compound can be from 0.01:1 to 10,000:1; alternatively from 0.1:1 to 100:1; alternatively, from 0.5:1 to 10:1; or alternatively, from 0.2:1 to 5:1. Typically, the amount of the fluoroorgano boron or fluoroorgano borate compound used as an activator for the transition metal compound s can be in a range of from about 0.5 mole to about 10 moles of boron compound per total mole of transition metal compound employed. In one aspect, the amount of fluoroorgano boron or fluoroorgano borate compound used as an activator for the transition metal compound is in a range of about 0.8 moles to 5 moles of boron compound per total moles of transition metal compound.

Ionizing Ionic Compounds

In a further aspect of this disclosure there is provided a method of producing an olefin polymer composition comprising contacting an olefin and a catalyst system, wherein the catalyst system can comprise a transition metal compound and an activator. In any embodiment provided here, the activator can comprise a solid oxide chemically-treated with an electron withdrawing anion. In a further aspect of any embodiment provided here, the catalyst system can comprise, either in combination with the chemically-treated solid oxide or any other activators(s) or alone, at least one ionizing ionic compound. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst system. While not bound by theory, it is believed that the ionizing ionic compound may be capable of reacting with the transition metal compound and converting it into a cationic transition metal compound or a transition metal compound that is an incipient cation. Again, while not intending to be bound by theory, it is believed that the ionizing ionic compound may function as an ionizing compound by at least partially extracting an anionic ligand such as a chloride or alkoxide from the transition metal compounds. However, the ionizing ionic compound is an activator regardless of whether it is ionizes the transition metal compounds, abstracts an anionic ligand in a fashion as to form an ion pair, weakens the metal- anionic ligand bond in the transition metal compound, simply coordinates to anionic ligand, or any other mechanism by which activation may occur.

Further, it is not necessary that the ionizing ionic compound activate the transition metal compounds only. The activation function of the ionizing ionic compound is evident in the enhanced activity of catalyst system as a whole, as compared to a catalyst system that does not comprise any ionizing ionic compound. It is also not necessary that the ionizing ionic compound activate different transition metal compounds to the same extent.

In one aspect and in any embodiment disclosed herein, the ionizing ionic compound can have the formula:

$$[Q]^+[M^3Z_4]^-.$$

In an embodiment, Q is selected from $[NR^AR^BR^CR^D]^+$, $[CR^ER^FR^G]^+$, $[C_7H_7]^+$, $Li^+$, $Na^+$, and $K^+$; alternatively, $[NR^AR^BR^CR^D]^+$; alternatively, $[CR^ER^FR^G]^+$; alternatively, $[C_7H_7]^+$; alternatively, $Li^+$; alternatively, $Na^+$; alternatively, $K^+$. In an embodiment, $R^A$, $R^B$, and $R^C$ are each selected independently from hydrogen, and a $C_1$ to $C_{20}$ hydrocarbyl; alternatively, hydrogen and a $C_1$ to $C_{10}$ hydrocarbyl; alternatively, hydrogen and a $C_6$ to $C_{20}$ aryl; alternatively, hydrogen and a $C_6$ to $C_{10}$ aryl; alternatively, hydrogen and a $C_1$ to $C_{20}$ alkyl; alternatively, hydrogen and a $C_1$ to $C_{10}$ alkyl; or alternatively, hydrogen and a $C_1$ to $C_5$ alkyl. In an embodiment, $R^D$ is selected from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; alternatively, hydrogen, a halide, and a $C_6$ to $C_{10}$ aryl; alternatively, hydrogen, a halide, and a $C_1$ to $C_{20}$ alkyl; alternatively, hydrogen, a halide, and a $C_1$ to $C_{10}$ alkyl; or alternatively, hydrogen, a halide, and a $C_1$ to $C_5$ alkyl. In an embodiment, $R^E$, $R^F$, and $R^G$ are each selected independently from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; or alternatively, hydrogen, a halide, and a $C_6$ to $C_{10}$ aryl. In some embodiments, Q may be a trialkyl ammonium or a dialkylarylamine (e.g. dimethyl anilinium); alternatively, triphenylcarbenium or substituted triphenyl carbenium; alternatively, tropylium or a substituted tropylium; alternatively, a trialkyl ammonium; alternatively, a dialkylarylamine (e.g. dimethyl anilinium) alternatively, a triphenylcarbenium; or alternatively, tropylium. In other embodiments, Q may be tri(n-butyl) ammonium, N,N-dimethylanilinium, triphenylcarbenium, tropylium, lithium, sodium, and potassium; alternatively, tri(n-butyl) ammonium and N,N-dimethylanilinium; alternatively, triphenylcarbenium, tropylium; or alternatively, lithium, sodium and potassium.

In an embodiment, $M^3$ is B or Al; alternatively, B; or alternatively, Al. In an embodiment, Z is selected independently from halide and

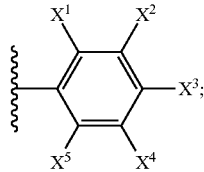

alternatively, halide; or alternatively,

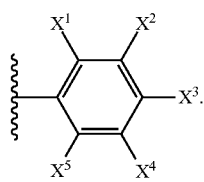

In an embodiment, $X^1$, $X^2$, $X^3$, $X^4$, and $X^5$ are each selected independently from hydrogen, a halide, a $C_1$ to $C_{20}$ hydrocarbyl, a $C_1$ to $C_{20}$ hydrocarboxy; alternatively, hydrogen, a halide, a $C_1$ to $C_{10}$ hydrocarbyl, a $C_1$ to $C_{10}$ hydrocarboxide; alternatively, hydrogen, a halide, a $C_6$ to $C_{20}$ aryl, a $C_1$ to $C_{20}$ alkyl, a $C_6$ to $C_{20}$ aryloxide, a $C_1$ to $C_{20}$ alkoxide; alternatively, hydrogen, a halide, a $C_6$ to $C_{10}$ aryl, a $C_1$ to $C_{10}$ alkyl, a $C_6$ to $C_{10}$ aryloxide, a $C_1$ to $C_{10}$ alkoxide; or alternatively, hydrogen, a halide, a $C_1$ to $C_5$ alkyl, a $C_1$ to $C_5$ alkoxide. In some embodiments, $X^1$, $X^2$, $X^3$, $X^4$, and $X^5$ may be selected independently from phenyl, p-tolyl, m-tolyl, 2,4-dimethylphenyl, 3,5-dimethylphenyl, pentafluorophenyl, and 3,5-bis(trifluoromethyl)phenyl; alternatively, phenyl; alternatively, p-tolyl; alternatively, m-tolyl; alternatively, 2,4-dimethylphenyl; alternatively, 3,5-dimethylphenyl; alternatively, pentafluorophenyl; or alternatively, 3,5-bis(trifluoromethyl)phenyl. In some embodiments, any hydrocarbyl, aryl, alkyl, hydrocarboxide, aryloxide, or alkoxide can be substituted by one or more halide, $C_1$ to $C_5$ alkyl, halide-substituted $C_1$ to $C_5$ alkyl, $C_1$ to $C_5$ alkoxide, or halide-substituted $C_1$ to $C_5$ alkoxide group. Particular halide, hydrocarbyl, aryl, alkyl, hydrocarboxide, and alkoxide are described herein and may be utilized without limitation to provide particular ionizing ionic compound having the formula $[Q]^+[M^3Z_4]^-$.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoro-methyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, or N,N-dimethylanilinium tetrakis(pentafluorophenyl)borate; alternatively, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis (trifluoromethyl)phenyl]borate, or triphenylcarbenium tetrakis(pentafluorophenyl)borate; alternatively, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, or tropylium tetrakis (pentafluorophenyl)borate; alternatively, lithium tetrakis (pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, or lithium tetrafluoroborate; alternatively, sodium tetrakis(pentafluorophenyl) borate, sodium tetrakis(phenyl) borate, sodium tetrakis(p-tolyl)borate, sodium tetrakis(m-tolyl)borate, sodium tetrakis (2,4-dimethylphenyl)borate, sodium tetrakis(3,5-dimethylphenyl)borate, or sodium tetrafluoroborate; alternatively, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, or potassium tetrafluoroborate; alternatively, tri(n-butyl)ammonium tetrakis(p-tolyl)aluminate, tri(n-butyl)ammonium tetrakis(m-tolyl)aluminate, tri (n-butyl)ammonium tetrakis(2,4-dimethylphenyl)aluminate, tri(n-butyl)ammonium tetrakis(3,5-dimethylphenyl)aluminate, tri(n-butyl)ammonium tetrakis(pentafluorophenyl)aluminate, N,N-dimethylanilinium tetrakis(p-tolyl)-aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethyl-phenyl)aluminate, or N,N-dimethylanilinium tetrakis (pentafluorophenyl)aluminate; alternatively, triphenylcarbenium tetrakis(p-tolyl)aluminate, triphenylcarbenium tetrakis(m-tolyl) aluminate, triphenylcarbenium tetrakis(2,4-dimethylphenyl) aluminate, triphenylcarbenium tetrakis(3,5-dimethylphenyl) aluminate, or triphenylcarbenium tetrakis-(pentafluorophenyl)aluminate; alternatively, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, or tropylium tetrakis(pentafluorophenyl)aluminate; alternatively, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl) aluminate, or lithium tetrafluoroaluminate; alternatively, sodium tetrakis(pentafluorophenyl)aluminate, sodium tetrakis(phenyl)aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, or sodium tetrafluoroaluminate; or alternatively, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate. In some embodiments, the ionizing ionic compound may be tri(n-butyl)ammonium tetrakis(3,5-dimethylphenyl)borate, tri(n-butyl)-ammonium tetrakis[3,5-bis (trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis[3,5-bis(trifluoro-methyl)phenyl]borate, N,N-dimethylanilinium tetrakis(pentafluorophenyl)borate, triphenyl-carbenium tetrakis (p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, or triphenylcarbenium tetrakis[3,5-bis(trifluoromethyl)phenyl] borate, lithium tetrakis(p-tolyl)aluminate, lithium tetrakis (m-tolyl)aluminate, lithium tetrakis(2,4-dimethylphenyl) aluminate, or lithium tetrakis(3,5-dimethylphenyl) aluminate.

Alternatively and in some embodiments, the ionizing ionic compound can be tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis[3,5-bis(trifluoro-methyl)phenyl]borate, N,N-dimethylanilinium tetrakis(pentafluorophenyl)borate, triphenylcarbenium tetrakis[3,5-bis(trifluoromethyl)phenyl]borate, lithium tetrakis(p-tolyl)aluminate, or lithium tetrakis(m-tolyl)aluminate; alternatively, tri(n-butyl)ammonium tetrakis[3,5-bis(trifluoromethyl)phenyl]borate; alternatively, tri (n-butyl)ammonium tetrakis(pentafluorophenyl)borate; alternatively, N,N-dimethylanilinium tetrakis[3,5-bis(trifluoromethyl)phenyl]borate; alternatively, N,N-dimethylanilinium tetrakis(pentafluorophenyl)borate; alternatively, triphenylcarbenium tetrakis[3,5-bis(trifluoro-methyl)phenyl]borate; alternatively, lithium tetrakis(p-tolyl)aluminate; or alternatively, lithium tetrakis(m-tolyl)aluminate. In other embodiments, the ionizing compound may be a combination of any ionizing compound recited herein. However, the ionizing ionic compound is not limited thereto in the present disclosure.

In one aspect and in any embodiment disclosed herein, the molar ratio of the ionizing ionic compound to the transition metal compound can be from 0.001:1 to 100,000:1. Alternatively and in any embodiment, the molar ratio of the ionizing ionic compound to the transition metal compound can be from 0.01:1 to 10,000:1; alternatively from 0.1:1 to 100:1; alternatively, from 0.5:1 to 10:1; or alternatively, from 0.2:1 to 5:1.

Second Activator

In an aspect, this disclosure provides a process for polymerizing an olefin, the process comprising providing a catalyst system comprising the contact product of: 1) a transition metal compound having formula (I); 2) a first activator comprising or selected from a number of various organometallic compounds or ionizing ionic compounds; and 3) a second activator comprising a solid oxide chemically-treated with an electron withdrawing anion. That is, the second activator includes a chemically-treated solid oxide.

Accordingly the second activator that is used in the processes and the catalyst system can comprise, consist essentially of, or can be selected from a solid oxide chemically-treated with an electron withdrawing anion. That is, any solid oxide or combinations of solid oxides disclosed herein that have been contacted and/or chemically-treated with any electron-withdrawing anion or combinations of electron-withdrawing anions disclosed herein can be used. Each of these components is set out in more detail below. Generally, examples of solid oxide that can be used in this disclosure include, but are not limited to, silica, alumina, silica-alumina, aluminum phosphate, mullite, silica-zirconia, silica-titania, or any combination thereof, and the like. Generally, examples of the electron withdrawing anions that can be used in accordance with this disclosure include, but are not limited to, fluoride, chloride, phosphate, triflate, sulfate, bisulfate, and the like. Therefore sources of these anions are used in preparing the chemically-treated solid oxide.

According to a further aspect, in the processes or catalyst system disclosed herein, the solid oxide chemically-treated with an electron withdrawing anion can comprise, consist essentially of, or be selected from at least one solid oxide treated with at least two electron-withdrawing anions, and the at least two electron-withdrawing anions can comprise, consist essentially of, or be selected from fluoride and phosphate, fluoride and sulfate, chloride and phosphate, chloride and sulfate, triflate and sulfate, or triflate and phosphate.

While further details of a chemically-treated solid oxide are set out below, generally, a wide range of solid oxides and sources of electron-withdrawing anions can be used to prepare the chemically-treated solid oxide. For example, in various aspects: 1) the solid oxide chemically-treated with an electron withdrawing anion can have a surface area from about 100 m$^2$/g to about 1000 m$^2$/g, a pore volume from about 0.25 mL/g to about 3.0 mL/g, and a particle size from about 5 microns to about 150 microns; 2) the solid oxide chemically-treated with an electron withdrawing anion can have a pore volume from about 0.5 mL/g to about 2.5 mL/g; and/or the solid oxide chemically-treated with an electron withdrawing anion can have a surface area from about 150 m$^2$/g to about 700 m$^2$/g.

Chemically-Treated Solid Oxide

The term "chemically-treated solid oxide" is used interchangeably with similar terms such as, "solid oxide treated with an electron-withdrawing anion," "treated solid oxide," or "solid super acid," which is also termed "SSA." While not intending to be bound by theory, it is thought that the chemically-treated solid oxide can serve as an acidic activator-support. In an aspect, the chemically-treated solid oxide typically can be used in combination with a first activator such as an organoaluminum compound or similar activating agent or alkylating agent. In another aspect, the transition metal compound can be "pre-activated" by, for example, being alkylated prior to its use in the catalyst system, prior to contacting the chemically-treated solid oxide.

In one aspect of this disclosure, the catalyst system can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this disclosure, the catalyst system can comprise a chemically-treated solid oxide comprising a solid oxide treated with an electron-withdrawing anion, wherein:

the solid oxide is selected from silica, alumina, silica-alumina, aluminum phosphate, mullite, boehmite, heteropolytungstates, titania, zirconia, magnesia, boria, zinc oxide, silica-zirconia, silica-titania, mixed oxides thereof, a pillared clay such as a pillared montmorillonite, or any combination thereof; and the electron-withdrawing anion is selected from fluoride, chloride, bromide, iodide, phosphate, trifluoroacetate, triflate, sulfate, bisulfate, fluorosulfate, fluorophosphate, fluoroborate, fluorozirconate, fluorotitanate, or any combination thereof.

In another aspect, the catalyst system can comprise a chemically-treated solid oxide comprising a solid oxide treated with an electron-withdrawing anion, wherein:

the solid oxide is selected from silica, alumina, silica-alumina, titania, zirconia, mullite, mixed oxides thereof, or mixtures thereof; and the electron-withdrawing anion is selected from fluoride, chloride, bisulfate, sulfate, or any combination thereof.

In an aspect, various examples of a solid oxide chemically-treated with an electron withdrawing anion (or "chemically-treated solid oxide" or CTSO) that can be used can comprise, can consist essentially of, or can be selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided mullite, chlorided mullite, bromided mullite, sulfated mullite, or a pillared clay such as a pillared montmorillonite that is treated with fluoride, chloride, or sulfate, phosphated alumina, or other aluminophosphates treated with sulfate, fluoride, or chloride, or any combination of these activator-supports.

Further, and in yet another aspect, the chemically-treated solid oxide can further comprise a metal or metal ion selected from zinc, nickel, vanadium, titanium, silver, copper, gallium, tin, tungsten, molybdenum, or any combination thereof. Therefore, in another aspect and in any embodiment of this disclosure, for example, the chemically-treated solid oxide can be selected from any chemically-treated solid oxide disclosed herein, which can further comprise a metal or metal ion selected from zinc, nickel, vanadium, silver, copper, gallium, tin, tungsten, molybdenum, or any combination thereof. By example, the second activator can comprise, consist essentially or, or can be selected from fluorided alumina, chlorided alumina, sulfated alumina, fluorided silica-alumina, chlorided silica-alumina, sulfated silica-alumina, fluorided silica-zirconia, sulfated silica-zirconia, or any combination thereof, that further can further comprise a metal or metal ion selected from zinc, nickel, vanadium, tin, or any combination thereof.

In an aspect, the chemically-treated solid oxides that further comprise a metal or metal ion can comprise, consist essentially of, or be selected from zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, or any combination thereof; alternatively , the chemically-treated solid oxide can be selected from fluorided alumina, chlorided alumina, sulfated alumina, fluorided silica-alumina, chlorided silica-alumina, sulfated silica-alumina, fluorided silica-zirconia, sulfated silica-zirconia, or any combination thereof.

In yet a further aspect and in any embodiment of this disclosure, the chemically-treated solid oxide can comprise the contact product of at least one solid oxide compound and at least one electron-withdrawing anion source. The solid oxide compound and electron-withdrawing anion source are described independently herein and may be utilized in any combination to further describe the chemically-treated solid oxide comprising the contact product of at least one solid oxide compound and at least one electron-withdrawing anion source. That is, the chemically-treated solid oxide is provided upon contacting or treating the solid oxide with the electron-withdrawing anion source. The solid oxide compound and electron-withdrawing anion source are described independently herein and may be utilized in any combination to further describe the chemically-treated solid oxide comprising the contact product of at least one solid oxide compound and at least one electron-withdrawing anion source. In one aspect, the solid oxide compound can comprise or alternatively be selected from, an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

While not intending to be bound by theory, the chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide may activate the transition metal compound in the absence of additional activators, additional activators may be utilized in the catalyst system. By way of example, it may be useful to include an organoaluminum compound in the catalyst system along with the transition metal compound and chemically-treated solid oxide. The activation function of the activator-support is evident in the enhanced activity of catalyst system as a whole, as compared to a catalyst system containing the corresponding untreated solid oxide.

In one aspect, the chemically-treated solid oxide of this disclosure can comprise a solid inorganic oxide material, a mixed oxide material, or a combination of inorganic oxide materials, that is chemically-treated with an electron-withdrawing component, and optionally treated with a metal. Thus, the solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this disclosure. The solid inorganic oxide material, mixed oxide material, combination of inorganic oxide materials, electron-withdrawing component, and optional metal are independently described herein and may be utilized in any combination to further described the chemically-treated solid oxide.

In another aspect, the chemically-treated solid oxide of this disclosure can comprise a solid oxide of relatively high porosity, which exhibits Lewis acidic or Brønsted acidic behavior. The solid oxide is chemically-treated with an electron-withdrawing component, typically an electron-withdrawing anion, to form an activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the oligomerization activities of the treated and untreated oxides under acid catalyzed reactions.

In one aspect, the chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements; alternatively, the chemically-treated solid oxide can comprise a solid inorganic oxide comprising oxygen and at least one element selected from Group 4, 5, 6, 12, 13, or 14 of the periodic table, or comprising oxygen and at least one element selected from the lanthanide elements. (See: Hawley's Condensed Chemical Dictionary, 11$^{th}$ Ed., John Wiley & Sons; 1995; Cotton, F. A.; Wilkinson, G.; Murillo; C. A.; and Bochmann; M. Advanced Inorganic Chemistry, 6$^{th}$ Ed., Wiley-Interscience, 1999.) Usually, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr; alternatively, the inorganic oxide can comprise oxygen and at least one element selected from Al, B, Si, Ti, P, Zn or Zr.

Further suitable examples of solid oxide materials or compounds that can be used in the chemically-treated solid oxide of the present disclosure include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof; alternatively, suitable examples of solid oxide materials or compounds that can be used in the chemically-treated solid oxide of the present disclosure include, but are not limited to, $Al_2O_3$, $B_2O_3$, $SiO_2$, $SnO_2$, $TiO_2$, $V_2O_5$, $WO_3$, $Y_2O_3$, ZnO, $ZrO_2$, and the like, including mixed oxides thereof, and combinations thereof; alternatively, suitable examples of solid oxide materials or compounds that can be used in the chemically-treated solid oxide of the present disclosure include, but are not limited to, $Al_2O_3$, $SiO_2$, $TiO_2$, $ZrO_2$, and the like, including mixed oxides thereof, and combinations thereof. Examples of mixed oxides that can be used in the activator-support of the present disclosure include, but are not limited to, silica-alumina, silica-titania, silica-zirconia, zeolites, many clay minerals, alumina-titania, alumina-zirconia, zinc-aluminate and the like; alternatively, examples of mixed oxides that can be used in the activator-support of the present disclosure include, but are not limited to, silica-alumina, silica-titania, silica-zirconia, alumina-titania, alumina-zirconia, zinc-aluminate and the like; alternatively, examples of mixed oxides that can be used in the activator-support of the present disclosure include, but are not limited to, silica-alumina, silica-titanic, silica-zirconia, alumina-titania, and the like.

In one aspect of this disclosure, the solid oxide material is chemically-treated by contacting it with at least one electron-withdrawing component, typically an electron-withdrawing anion source. Further, the solid oxide material can be chemically-treated with a metal ion if desired, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and the metal ion if present can be calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. Generally, fluoride, sources of fluoride, chloride, bisulfate, sulfate, and the like, including mixtures and combinations thereof, are particularly useful. In addition, other ionic or non-ionic compounds that serve as sources for these electron-withdrawing anions may also be employed in the present disclosure.

When the electron-withdrawing component can comprise a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like; alternatively, ammonium; alternatively, trialkyl ammonium; alternatively, tetraalkyl ammonium; alternatively, tetraalkyl phosphonium; or alternatively, $H^+$, $[H(OEt_2)_2]^+$.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this disclosure is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the disclosure, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this disclosure, the solid oxide activator-support (chemically-treated solid oxide) is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this disclosure is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this disclosure, once the solid oxide has been treated and dried, it may be subsequently calcined. Calcining of the treated solid oxide is generally conducted in an ambient atmosphere; alternatively, in a dry ambient atmosphere. The solid oxide may be calcined at a temperature from about 200° C. to about 900° C.; alternatively, from about 300° C. to about 800° C.; alternatively, from about 400° C. to about 700° C.; or alternatively, from about 350° C. to about 550° C. The period of time at which the solid oxide is maintained at the calcining temperature may be about 1 minute to about 100 hours; alternatively, from about 1 hour to about 50 hours; alternatively, from about 3 hours to about 20 hours; or alternatively from about 1 to about 10 hours.

Further, any type of suitable ambient atmosphere can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the disclosure, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 $m^2/g$, and in still another aspect, from about 250 to about 600 $m^2/g$.

Regarding the sources of the electron-withdrawing anions, generally, the solid oxide material can be treated with a source of halide ion or sulfate ion or other electron withdrawing anions, optionally treated with a metal ion if desired, then calcined to provide the chemically-treated solid oxide in the form of a particulate solid. Thus, reference is made herein to the source of the sulfate ion (termed a sulfating agent), the source of chloride ion (termed a chloriding agent), the source of fluoride ion (termed a fluoriding agent) and the like, used to provide the chemically-treated solid oxide.

In one aspect of this disclosure, the chemically-treated solid oxide can comprise a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this disclosure include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate)

$((NH_4)_2SiF_6)$, ammonium hexafluorophosphate $(NH_4PF_6)$, analogs thereof, and combinations thereof; alternatively, hydrofluoric acid (HF), ammonium fluoride $(NH_4F)$, ammonium bifluoride $(NH_4HF_2)$, ammonium tetrafluoroborate $(NH_4BF_4)$, analogs thereof, and combinations thereof. For example, ammonium bifluoride $NH_4HF_2$ may be used as the fluoriding agent, due to its ease of use and ready availability.

In another aspect of the present disclosure, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the disclosure include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present disclosure, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the disclosure include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

In an aspect, silica-alumina may be utilized as the solid oxide material. The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2$/g. In one aspect, the surface area is greater than about 250 $m^2$/g, and in another aspect, the surface area may be greater than about 350 $m^2$/g. Generally, the silica-alumina of this disclosure has an alumina content from about 5 to about 95%. In one aspect, the alumina content of the silica-alumina may be from about 5 to about 50%, and in another aspect, the alumina content of the silica-alumina may be from about 8% to about 30% alumina by weight. In yet another aspect, the solid oxide component can comprise alumina without silica and in another aspect, the solid oxide component can comprise silica without alumina.

The sulfated solid oxide can comprise sulfate and a solid oxide component such as alumina or silica-alumina, in the form of a particulate solid. The sulfated oxide can be further treated with a metal ion if desired such that the calcined sulfated oxide can comprise a metal. In one aspect, the sulfated solid oxide can comprise sulfate and alumina. In one aspect of this disclosure, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the disclosure, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or mettal-containing compound are contacted and calcined simultaneously.

In an aspect, the transition metal compound or combination of transition metal compounds may be precontacted with an olefin and/or an first activator such as an organoaluminum compound for a first period of time prior to contacting this mixture with the chemically-treated solid oxide. Once the precontacted mixture of the transition metal compound, olefin, and/or organoaluminum compound is contacted with the chemically-treated solid oxide, the composition further comprising the chemically-treated solid oxide is termed the "postcontacted" mixture. The postcontacted mixture can be allowed to remain in further contact for a second period of time prior to being charged into the reactor in which the polymerization process will be carried out.

Various processes to prepare solid oxide activator-supports that can be employed in this disclosure have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, 6,548,441, 6,750,302, 6,831,141, 6,936,667, 6,992,032, 7,601,665, 7,026,494, 7,148,298, 7,470,758, 7,517,939, 7,576,163, 7,294,599, 7,629,284, 7,501,372, 7,041,617, 7,226,886, 7,199,073, 7,312,283, 7,619,047, and U.S. Patent Appl. Publ. No. 2010/0076167, describe such methods, each of which is incorporated by reference herein, in pertinent part.

Catalyst System and Polymerization Process

In an aspect, this disclosure encompasses a catalyst system comprising a transition metal compound, a first activator such as an organoaluminum compound, and a second activator such as a solid oxide treated with an electron withdrawing anion. Useful examples of the polymerization method include a process by which at least one olefin monomer and the catalyst system can be contacted under any one or any combination of more than one of the following conditions:

a) the molar ratio of the first activator to the transition metal compound is from about 20:1 to about 500:1;
b) the weight ratio of the second activator to the transition metal compound is from about 5:1 to about 1,000:1; and/or
c) the weight ratio of the at least one olefin monomer to the transition metal compound is from about 1,000:1 to about 100,000,000:1.

In another aspect, for example, the at least one olefin monomer and the catalyst system can be contacted under any one or any combination of more than one of the following conditions:

a) the first activator comprises an organoaluminum compound and the molar ratio of the first activator to the transition metal compound is from about 10:1 to about 500:1;
b) the second activator comprises a fluorided silica-alumina or a fluorided mullite, and the weight ratio of the second activator to the transition metal compound is from about 5:1 to about 1,000:1; and/or
c) the weight ratio of the at least one olefin monomer to the transition metal compound is from about 1,000:1 to about 100,000,000:1.

According to a further aspect, the polymerization conditions can include any one or any combination of more than one of the following conditions:

a) a temperature range from about 40° C. to about 120° C.;
b) a partial pressure of the olefin monomer comprising ethylene from about 15 psi to about 1500 psi; and/or
c) a time of the contacting step of from about 1 minute to about 3 hours.

In an aspect, the process for polymerizing an olefin according to this disclosure can be conducted in a polymerization reactor system comprising or being selected from any of a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof. A loop-slurry reactor can be particularly useful. Further, the polymerization can be conducted in a polymerization reactor system comprising a single reactor, or can be conducted in a polymerization reactor system comprising two or more reactors.

For example, in an aspect, the polymerization conditions suitable to form a polyethylene can comprise a polymerization reaction temperature from about 50° C. to about 120° C. and a reaction pressure from about 100 psig to about 1000 psig (about 1.4 to about 6.9 MPa). Alternatively, the polymerization reaction temperature can be from about 60° C. to about 120° C. and a reaction pressure from about 200 psig to about 1000 psig. In another aspect, no hydrogen is added to the polymerization reactor system. In a further aspect, hydrogen is added to the polymerization reactor system when desired.

In an aspect, the polymerization conditions can comprise contacting the catalyst system with at least one olefin monomer in the presence of a diluent comprising bulk polymerizations, propane, iso-butane, n-pentane, iso-pentane, heptane, hexane or a combination thereof. The polymerization conditions also can comprise a co-polymerization of ethylene with a co-monomer or more than one co-momoner as described herein. For example, the olefin monomer can further comprise at least one $C_3$ to $C_{20}$ olefin comonomer. In one aspect, the olefin monomer can further comprise at least one olefin comonomer, the comonomer comprising, consisting essentially of, or being selected from propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a combination thereof.

The disclosure also provides for, in an aspect, a process for polymerizing an olefin wherein the step of providing a catalyst system further comprises providing the contact product in a solvent. That is, the step of contacting the catalyst system components can be and typically is carried out in a solvent or a combination of solvents. Moreover, any order of contacting the components can be used. For example, the first activator and the second activator can be contacted in a solvent prior to contact with the transition metal compound. In another aspect, the first activator, the second activator, and the at least one olefin monomer comprising ethylene can be contacted in a solvent prior to contact with the transition metal compound. According to other aspects, the first activator and the transition metal compound can be contacted in a solvent in the presence or absence of the at least one olefin monomer comprising ethylene, prior to contacting with the second activator. A further aspect provides that the second activator and the transition metal compound can be contacted in a solvent in the presence or absence of the at least one olefin monomer comprising ethylene, prior to contacting with the first activator.

According to an aspect, the polymerization process can be conducted in a tubular reactor, under suitable polymerization conditions. In a further aspect, the polymerization process can be conducted in continuous stirred tank reactor (CSTR), under suitable polymerization conditions.

LDPE Polymer Properties

This disclosure provides for catalyst systems, processes for making the catalyst systems, and processes for polymerizing at least one olefin monomer comprising ethylene to form a low-density polyethylene (LDPE). In an aspect, for example, this disclosure demonstrates how to produce LDPE under substantially lower pressures and milder conditions than the standard conditions used to generate LDPE by the conventional free-radical process.

In an aspect, the LDPE prepared by the process disclosed herein can be an ethylene homopolymer, and the number-average molecular weight (Mn) of the olefin polymer produced by the process can be from about 5,000 g/mol to about 250,000 g/mol, from about 10,000 g/mol to about 200,000 g/mol, or from about 20,000 g/mol to about 150,000 g/mol.

According to an aspect, the olefin polymer produced by the process disclosed herein can be an ethylene homopolymer and can have a weight-average molecular weight (Mw) of from about 50,000 g/mol to about 700,000 g/mol, from about 75,000 g/mol to about 500,000 g/mol, or from about 100,000 g/mol to about 400,000 g/mol.

In an aspect, the olefin polymer produced by the disclosed process can be an ethylene homopolymer and the density of the olefin polymer can be from about 0.89 g/cm$^3$ to about 0.95 g/cm$^3$, from about 0.89 g/cm$^3$ to about 0.94 g/cm$^3$, or from about 0.90 g/cm$^3$ to about 0.93 g/cm$^3$.

Another aspect provides that the melt index (MI) of the olefin polymer produced by the process can be from about 0 g/10 min to about 20 g/10 min, from about 0.1 g/10 min to about 10 g/10 min, or from about 0.5 g/10 min to about 3 g/10 min. Further, the crystallization temperature of the olefin polymer produced by the process disclosed herein can be from about 110° C. to about 135° C., as measured by Differential Scanning calorimetry (DSC).

Examples of polymer properties for the LDPE polymer produced according to the disclosure includes, but are not limited to the following. In an aspect, the olefin polymer produced by the disclosed process can be characterized by any one or any combination of more than one of the following properties:
 a) a density from about 0.900 g/mL$^3$ to about 0.950 g/mL$^3$;
 b) a weight-average molecular weight (Mw) from about 12,000 to about 600,000;
 c) a number-average molecular weight (Mn) from about 10,000 to about 150,000;
 d) a melting point from about 105° C. to about 135° C.;
 e) a polydispersity (Mw/Mn) from about 2.0 to about 8.0;
 f) a flow activation from about 20 kJ/mol to about 35 kJ/mol; and/or
 g) a number of short chain branches from 4 per 1,000 total carbons to 15 per 1,000 total carbons.

Alternatively and in another aspect, the olefin polymer produced by the disclosed process can be characterized by any one or any combination of more than one of the following properties:
 a) a density from about 0.905 g/mL$^3$ to about 0.945 g/mL$^3$;
 b) a weight-average molecular weight (Mw) from about 50,000 to about 400,000;
 c) a number-average molecular weight (Mn) from about 12,000 to about 150,000;
 d) a melting point from about 110° C. to about 130° C.;
 e) a polydispersity (Mw/Mn) from about 2.0 to about 7.0;
 f) a flow activation from about 22 kJ/mol to about 32 kJ/mol; and/or
 g) a number of short chain branches from 6 per 1,000 total carbons to 12 per 1,000 total carbons.

The short chain branching of the LDPE according to this disclosure has been examined, and the number of short chain branches of the LDPE generally can be from about 6 per 1,000 total carbons to 12 per 1,000 total carbons. For example, in the disclosed process, the olefin polymer produced by the process can be characterized by from about 1.5 wt % to about 5.5 wt % methyl branching, from about 0.2 wt % to about 2.5 wt % ethyl branching, and from about 0.1 wt % to about 1 wt % butyl branching. In a further example, in the disclosed process, the olefin polymer produced by the process can be characterized by from about 2.5 wt % to about 3.5 wt % methyl branching, from about 0.5 wt % to about 1.5 wt % ethyl branching, and from about 0.05 wt % to about 0.45 wt % butyl branching. Moreover, the olefin polymer produced by the disclosed process also can be characterized by any one or any combination of more than one of the following properties:
 a) from about 1.5 wt % to about 5.5 wt % methyl branching;
 b) from about 0.2 wt % to about 2.5 wt % ethyl branching; and
 c) from about 0.1 wt % to about 1 wt % butyl branching.

The olefin polymer produced by the disclosed process can further be characterized by any one or any combination of more than one of the following properties:
 a) from about 2.5 wt % to about 3.5 wt % methyl branching;
 b) from about 0.5 wt % to about 1.5 wt % ethyl branching; and
 c) from about 0.05 wt % to about 0.45 wt % butyl branching.

It has been discovered that particular combinations of properties of the LDPE prepared according to this disclosure occur. For example, in an aspect, the olefin polymer produced by the process can be characterized by any one or any combination of more than one of the following properties:
 a) a polydispersity (Mw/Mn) from about 2.5 to about 7.0;
 b) a flow activation from about 22 kJ/mol to about 32 kJ/mol;
 c) a number of short chain branches from 6 per 1,000 total carbons to 12 per 1,000 total carbons;
 d) a dynamic viscosity $\eta_0$(Pa·s) from about $10^6$ Pa·s to about $10^8$ Pa·s at a weight average molecular weight (Mw, SEC) from about $2\times10^5$ to about $3\times10^5$; and/or
 e) a zero shear viscosity $\eta_0$(Pa·s) of less than or about $10^7$ Pa·s at a weight average molecular weight (Mw, SEC) from about $2.25\times10^5$ to about $3.25\times10^5$.

In a further aspect, the properties of the polymer produced according to this disclosure can be adjusted or tailored according to the catalyst design and selection. For example, when the transition metal compound has the formula according to formula (I) shown here:

wherein $R^1$ and $R^4$ can be selected independently to adjust the molecular weight and/or the molecular weight distribution. For example, when $R^1$ and $R^4$ are different, the molecular weight distribution can be broadened as compared to the molecular weight distribution when $R^1$ and $R^4$ are the same. This process and associated catalyst of this disclosure can also provide a higher amount or degree of branching (for example, measured by $^{13}$C NMR) using a higher molecular-weight forming catalyst. For example, an inverse branch distribution can be produced with the disclosed process and catalyst. It has also been observed that the disclosed process and catalyst generally do not cause reactor fouling, as evidenced by visual inspection and/or particle morphology studies using, for example, scanning electron microscopy of the particles produced.

Articles

This disclosure also provides, in an aspect, a method for forming or preparing an article of manufacture comprising an olefin polymer, in which the method can comprise a) performing the olefin polymerization process according to any process disclosed herein; and b) fabricating the article of manufacture comprising the olefin polymer by any technique disclosed herein.

In another aspect, the article of manufacture comprising the olefin polymer that can be fabricated or made can be, for example, an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

EXAMPLES

Preparation of α-Diimine Ligands

The following nomenclature is used for the α-diimine ligands that are prepared according to the examples that follow.

Ex. 1.

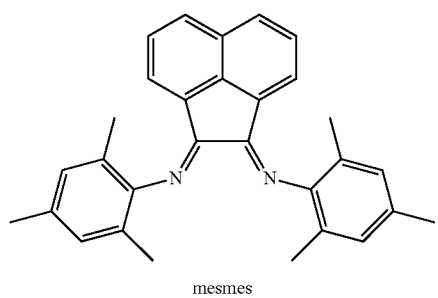

mesmes

Ex. 2.

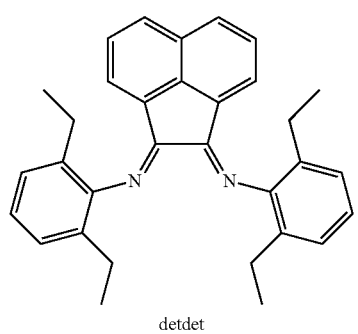

detdet

Ex. 3.

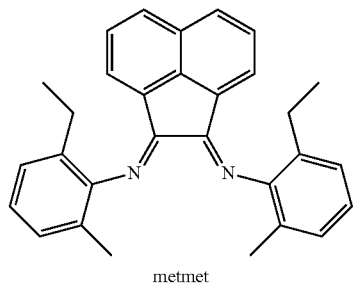

metmet

Ex. 4.

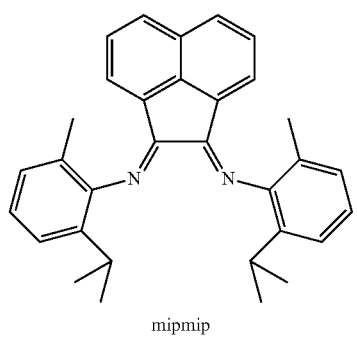

mipmip

Ex. 5.

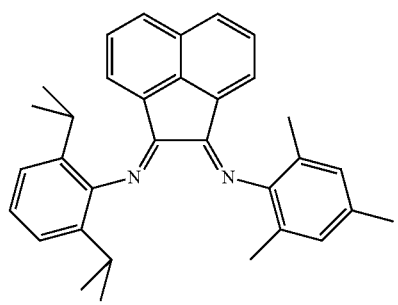

dipmes

Ex. 6.

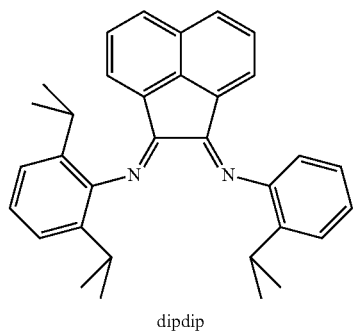

dipdip

-continued

Ex. 7.

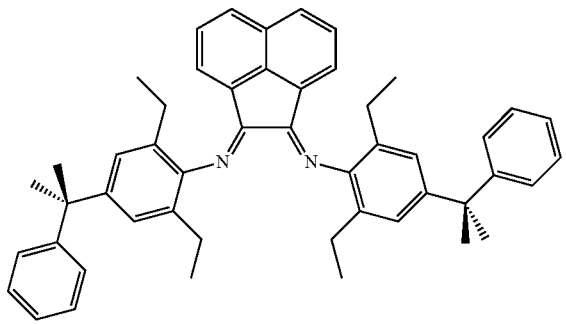

didetams

Ex. 8.

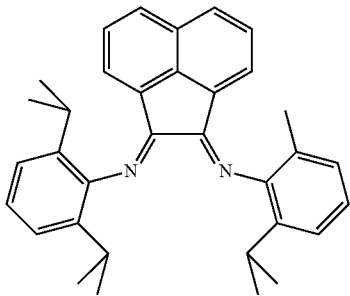

dipmip

Example 1

Mesmes Ligand Preparation (Corresponding to Example 10 Ni Complex)

A mixture of 2.37 g (13 mmol) of acenaphthenequinone, 3.80 g (28 mmol) of 2,4,6-trimethylaniline, and 0.5 mL of formic acid were heated overnight at 60° C. in 30 mL of methanol. Filtration of the precipitated yellow solid gave 4.65 g (86% yield) of the desired diimine (>98% purity by $^1$H NMR).

Example 2

Detdet Ligand Preparation (Corresponding to Example 11 Ni Complex)

This ligand was prepared in 87% yield, with similar purity to the ligand of Example 1, employing an analogous route to that described in Example 1 using the appropriately substituted aniline.

Example 3

Metmet Ligand Preparation (Corresponding to Example 12 Ni Complex)

The ligand was prepared in 55% yield, with similar purity to the ligand of Example 1, employing an analogous route to that described in Example 1 using the appropriately substituted aniline.

Example 4

Mipmip Ligand Preparation (Corresponding to Example 13 Ni Complex)

The ligand was prepared in 89% yield, with similar purity to the ligand of Example 1, employing an analogous route to that described in Example 1 using the appropriately substituted aniline.

Example 5

Dipmes Ligand Preparation (Corresponding to Example 14 Ni Complex)

First, the monoimine was prepared from 2,6-diisopropylaniline and acenaphthene quinone, according to the procedure described in Carney et al, *Dalton Trans.*, 2007, 2547. The asymmetric diimine ligand, dipmes, was then prepared by the following method. A mixture of 2.39 g (7.00 mmol) of the monoimine, 1.08 g (8.00 mmol) of 2,4,6-trimethylaniline, 0.4 mL of formic acid, and 20 mL of methanol were heated overnight at 60° C. Filtration of the precipitated product gave 2.83 g (88% yield) of the desired diimine in 93% purity (via $^1$H NMR). The major impurity was residual monoimine. This ligand was used "as is" without further purification.

Example 6

Dipip Ligand Preparation (Corresponding to Example 15 Ni Complex)

The monoimine was first prepared according to the reference given in Example 6. The asymmetric diimine ligand, dipip, was then prepared in 86% yield, with 94% purity (via $^1$H NMR), according to an analogous method of Example 6 using the appropriately substituted aniline.

Example 7

Didetams Ligand Preparation (Corresponding to Example 16 Ni Complex)

The diimine was prepared in a two-step procedure, as follows. First, 2,6-diethylaniline was alkylated selectively in the para-position by the following method. In a drybox, 31 mmol of aluminum bromide and 269 mmol of 2,6-diethylaniline were combined in a 250 mL 3-necked, round-bottom flask with a stir bar. The flask also had a thermocouple adaptor, with the thermocouple affixed. In an addition funnel, 673 mmol of the α-methylstyrene were added, and the sealed apparatus with the affixed addition funnel was removed from the drybox and transferred to a fume hood. Stirring was initiated, and the flask contents were heated to 155° C. and relieved to a bubbler. The olefin was added slowly over several hours. Samples for GC analysis of conversion were taken periodically and quenched with sodium hydroxide. When the acceptable conversion had been reached, the reaction mixture was allowed to cool to room temperature, and 64 g of 12% NaOH were added to the addition funnel and then added to the flask. The mixture became very viscous. Additional amounts of NaOH and water could be added, followed by a light hydrocarbon solvent (~150 mL, e.g. n-hexane) to aid with mixing and separation. The turbid liquid was added to a separatory funnel, and separation of the layers resulted in a polymer component at the interface. The organic layer was isolated, filtered, and extracted with water three times. The light hydrocarbons were removed by rotary evaporation, and the unreacted aniline and olefin were removed by vacuum distillation. A white, crystalline solid was isolated and identified as the desired product by NMR and GC/MS.

Secondly, the diimine ligand, didetams, was then prepared in 89% yield, with similar purity to the ligand of Example 1, employing an analogous route to that described in Example 1 using the substituted aniline from the first step.

Example 8

Dipmip Ligand Preparation (Corresponding to Example 17 Ni Complex)

The monoimine was first prepared according to the reference given in Example 6. The asymmetric diimine ligand, dipmip, was then prepared in 92% yield, with >98% purity (via $^1$H NMR), according to an analogous method of Example 6 using the appropriately substituted aniline.

Example 9

A 21 Ligand Mixture Preparation (Corresponding to Example 18 Ni Complex Mixture)

A 3.0 mmol-sample of each of the following anilines were combined: 2,6-diisopropylaniline, 2-isopropyl-6-methylaniline, 2-t-butylaniline, 2,6-diethylaniline, 2-ethyl-6-methylaniline, and 2,4,6-trimethylaniline. The aniline mixture was added to 1.62 g (8.9 mmol) acenaphthenequinone, 0.5 mL formic acid, and 30 mL methanol. The reaction mixture was heated overnight at 60° C., and the precipitated ligand mixture (2.21 g, 56% yield) was isolated by filtration and washed with cold methanol. $^1$H NMR showed a complex mixture of diimines.

Examples 10-18

Metalation of Diimine Ligands

The ligands of Examples 1-9 were each combined with (dimethoxyethane)NiCl$_2$ [(DME)NiCl$_2$] in methylene chloride suspension at ambient temperature. After stirring overnight, each reaction mixture was poured into pentane, and the precipitated solids were removed by filtration and dried. The ligand of Example 1 was used to prepare the Example 10 complex, Example 2 ligand was used to prepare example 11 complex, and so on, through the Example 8 ligand being used to prepare the Example 17 complex, according to the figure. Complex mixture 18 (not shown) was prepared from the ligand mixture of example 9. The Examples 10-17 complexes (metalated ligands) are illustrated here.

Ex. 10
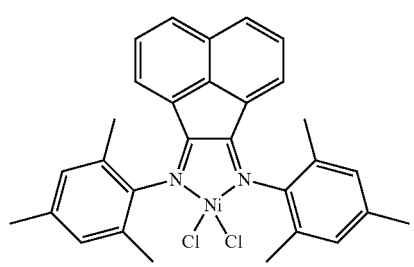

Ex. 11
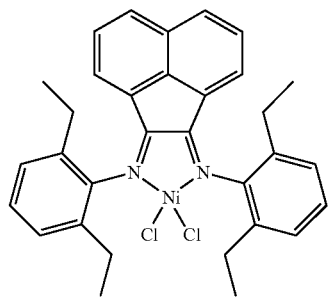

Ex. 12
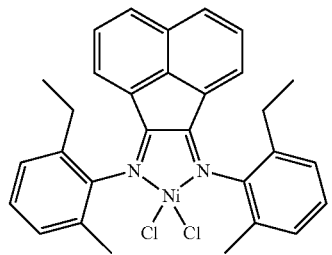

Ex. 13
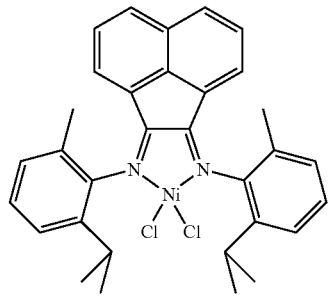

Ex. 14
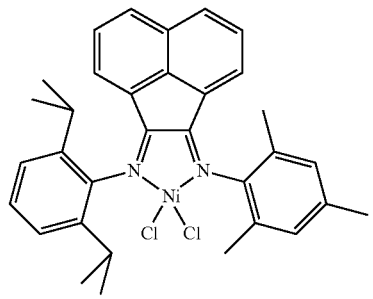

Ex. 15
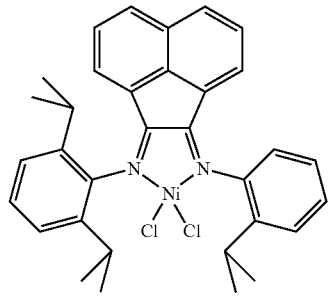

-continued

Ex. 16

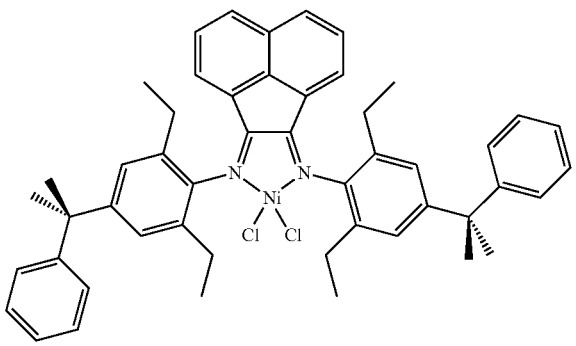

Ex. 17

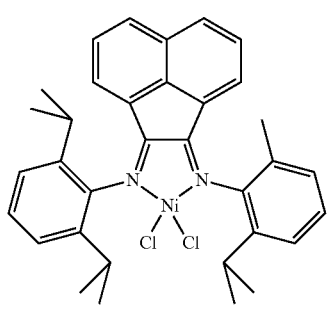

Examples 19-27

Supported Nickel Complexes

In a typical catalyst preparation, a Ni complex prepared according to the previous examples was supported on mullite SSA (fluorided mullite). The relative amounts of nickel used to prepare the mullite-supported Ni complexes ranged from 0.2 wt % Ni to 1.07 wt % Ni. The following method was used.

In a glove box under inert nitrogen atmosphere, the selected Ni complex and mullite SSA were added to a scintillation vial containing a magnetic stir bar and 30 mL of toluene. The mixture was stirred at rapidly at ambient temperature (20° C.) for two hours. After this time, the mixture was filtered, and the clear filtrate and was discarded. The mullite-supported Ni complex was dried at 35-40° C. for one hour. Descriptions of the various supported catalysts are given in the Table. XRF analysis of two separate mullite-supported Ni complexes showed that the target Ni concentration of the supported catalyst, as set out in Table 1, was achieved through this method.

TABLE 1

Catalyst Support Reaction Details.

| Example | Description |
|---|---|
| 19 | 0.3 wt % Ni (Example 15, dipip) on mullite SSA |
| 20 | 0.3 wt % Ni (Example 10, mesmes) on mullite SSA |
| 21 | 0.3 wt % Ni (Example 13, mipmip) on mullite SSA |
| 22 | 0.3 wt % Ni (Example 12, metmet) on mullite SSA |
| 23 | 0.3 wt % Ni (Example 14, dipmes) on mullite SSA |
| 24 | 0.3 wt % Ni (Example 17, dipmip) on mullite SSA |
| 25 | 0.2 wt % Ni (Example 11, detdet) on mullite SSA |
| 26 | 0.5 wt % Ni (Example 11, detdet) on mullite SSA |
| 27 | 0.3 wt % Ni (Example 18, catalyst mixture) on mullite SSA |

XRF Analysis of Examples 25 and 26

Approximately 0.2 grams of each catalyst sample was placed in a liquid cup and covered with a Prolene film to prepare the XRF specimen. The sample was analyzed in helium. Survey scans for elements ranging from sodium to uranium were performed. Semiquantitative concentrations are reported for all of the elements detected.

TABLE 2

Catalyst Preparation Prior to XRF Analysis.

| | Example | |
|---|---|---|
| | 25 | 26 |
| catalyst MW | 574 | 574 |
| wt % Ni target | 0.2 | 0.5 |
| mg catalyst complex | 20 | 20 |
| mg Ni | 1.95 | 1.95 |
| mg mullite SSA support | 950 | 370 |
| total mg of supported complex | 970 | 390 |

TABLE 3

XRF Results

| Element | Example 25 | Example 26 |
|---|---|---|
| Al | 32.70% | 31.80% |
| Si | 17.60% | 17.90% |
| S | 0.0275% | 0.0387% |
| Cl | 0.298% | 0.880% |
| Ca | 63 PPM | 0.0130% |
| Ti | 31 PPM | 39 PPM |
| Cr | 70 PPM | 83 PPM |
| Fe | 0.0120% | 0.0121% |
| Ni | 0.191% | 0.486% |
| Ga | 22 PPM | 26 PPM |

Examples 28-44

Ni Catalyzed Polyethylene (PE) Batch Reaction Procedure and Resulting Polymer

Referring to Table 4, in a dry box under inert nitrogen atmosphere, the designated supported Ni catalyst complex and 100 mL of pentane were added to a glass addition funnel and an aluminum alkyl cocatalyst (DEAC, TiBAl, MMAO-3A, or MMAO-7) and 100 mL of pentane were added to a second addition funnel. Outside of the dry box, the addition funnel with the supported catalyst complex was secured to the addition port of a 500 mL Zipperclave® reactor at ambient temperature (20° C.). The reactor was evacuated for approximately ten minutes before charging the mixture into the reactor. The second addition funnel was secured to the addition port, the reactor was evacuated for briefly, and the contents of the addition funnel were charged into the reactor.

The charged reactor was pressurized to 100-600 psig with ethylene and heated to 50-70° C. with a heating mantle. The reaction was allowed to run for one hour, while being stirred continuously. The temperature was controlled to within ±5° C. of the target temperature by an internal cooling coil with circulating chilled water and a heating mantle. After the reaction was complete, the reactor was cooled to 35° C. and depressurized. The product resulting was air dried overnight, weighed to determine the reaction yield, and analyzed by DSC and GPC to determine the melting point and molecular weight.

TABLE 4

Examples 28-44 polymerization data

| Example | Catalyst | Support/Amt (mg) ($2^{nd}$ activator) | Ni complex (mg) | Cocat/Amt (mg) ($1^{st}$ activator) | T (° C.) | P ethylene (psia) | Time (min) | PE yield (g) |
|---|---|---|---|---|---|---|---|---|
| 28 | Ex. 5, note 1 | | 6.72 | MMAO, 400:1 Al:Ni | 30 | 15, note 2 | 60 | 3.31 |
| 29 | Ex. 16 | | 5.0 | DEAC (250) | 25 | 15 | 75 | 1.45 |
| 30 | Ex. 16 | F-SSA (500) | 3.0 | DEAC (220) | 35 | 15 | 240 | 8.59 |
| 31 | Ex. 16 | m-SSA (500) | 3.0 | DEAC (220) | 35 | 15 | 240 | 13.5 |
| 32 | Ex. 11 | m-SSA (500) | 2.13 | DEAC (220) | 35 | 15 | 240 | 12.6 |
| 33 | Ex. 11, note 3 | m-SSA (150) | 1.2 | DEAC (100) | 50 | 300 | 30 | 31.6 |
| 34 | Ex. 26, note 4 | m-SSA (38) | 2.0 | DEAC (175) | 55 | 300 | 60 | 27.1 |
| 35 | Ex. 19 | m-SSA (81) | 2.0 | TIBA (78), see note 7 | 60 | 300 | 60 | 38.8 |
| 36 | Ex. 20 | m-SSA (70) | 2.0 | TIBA (79) | 60 | 300 | 60 | 14.1 |
| 37 | Ex. 21 | m-SSA (66) | 2.0 | TIBA (78) | 60 | 300 | 60 | 15.7 |
| 38 | Ex. 22 | m-SSA (70) | 2.0 | TIBA (78) | 60 | 300 | 60 | 13.4 |
| 39 | Ex. 23 | m-SSA (65) | 2.0 | TIBA (78) | 60 | 300 | 60 | 13.5 |
| 40 | Ex. 24 | m-SSA (65) | 2.0 | TIBA (78) | 60 | 300 | 60 | 9.5 |
| 41 | Ex. 25 | m-SSA (98) | 2.0 | TIBA (78) | 60 | 300 | 60 | 34.6 |
| 42 | Ex. 27 | m-SSA (66) | 2.0 | TIBA (78) | 60 | 300 | 60 | 16.8 |
| 43 | D139 mLLDPE, see note 5 | | | | | | | |
| 44 | 4517 LDPE, see note 6 | | | | | | | |

NOTES:
1) activation in situ with 5.0 mg ligand and 1.72 mg Ni(acac)$_2$.
2) Low pressure experiments used methylcyclohexane, cyclohexane, toluene, or n-pentane as solvent.
3) The n-pentane solvent (200 ml), DEAC, and m-SSA were charged to the reactor as a slurry, and the reaction was initiated at the desired pressure by starting the reactor stirrer, which broke a sealed NMR tube of the Ni complex solution. This is an alternative method for polymerization to the route described for Examples 19-27.
4) Four runs under identical conditions. Yield is the average of the four runs.
5) D139 is CPChem metallocene LLDPE, included for comparative purposes.
6) 4517 is CPChem LDPE, included for comparative purposes.
7) TIBA was observed to cause no fouling of the reactor internal surfaces. DEAC was observed to cause fouling.

Analysis of Polymers Produced According to the Disclosure

Referring to the Examples 28-44 polymerization data and conditions presented in Table 4, and referencing the catalyst and second activator (support) combinations provided in Table 1, the following analytical data for the nickel-catalyzed low-density polyethylene (LDPE) produced in Example 34 is set out in Table 5. Comparisons with mLLDPE and conventional LDPE are also presented this table.

TABLE 5

Analysis of polyethylene produced in Example 34, including branching as determined by $^{13}$C NMR

| ID | MI | HLMI | Density (g/cc) | Tm (C.) | Elution Temperature (C.) | Flow Activation Energy Ea (KJ/mol) |
|---|---|---|---|---|---|---|
| Ex. 34 | 0 | 0 | 0.9178 | 124.3 | 96.7 | 27 |
| D139 (mLLDPE) | 1 | N/A | 0.918 | 116.4 | 77.8/91.6 | 33 |
| 4517 (LDPE) | 5 | N/A | 0.923 | 109.9 | 78.0 | 53 |

| ID | Methyl Branching (wt %) | Ethyl Branching (wt %) | Butyl Branching (wt %) |
|---|---|---|---|
| Ex. 34 | 3.18 | 0.91 | 0.19 |

Figure 2:
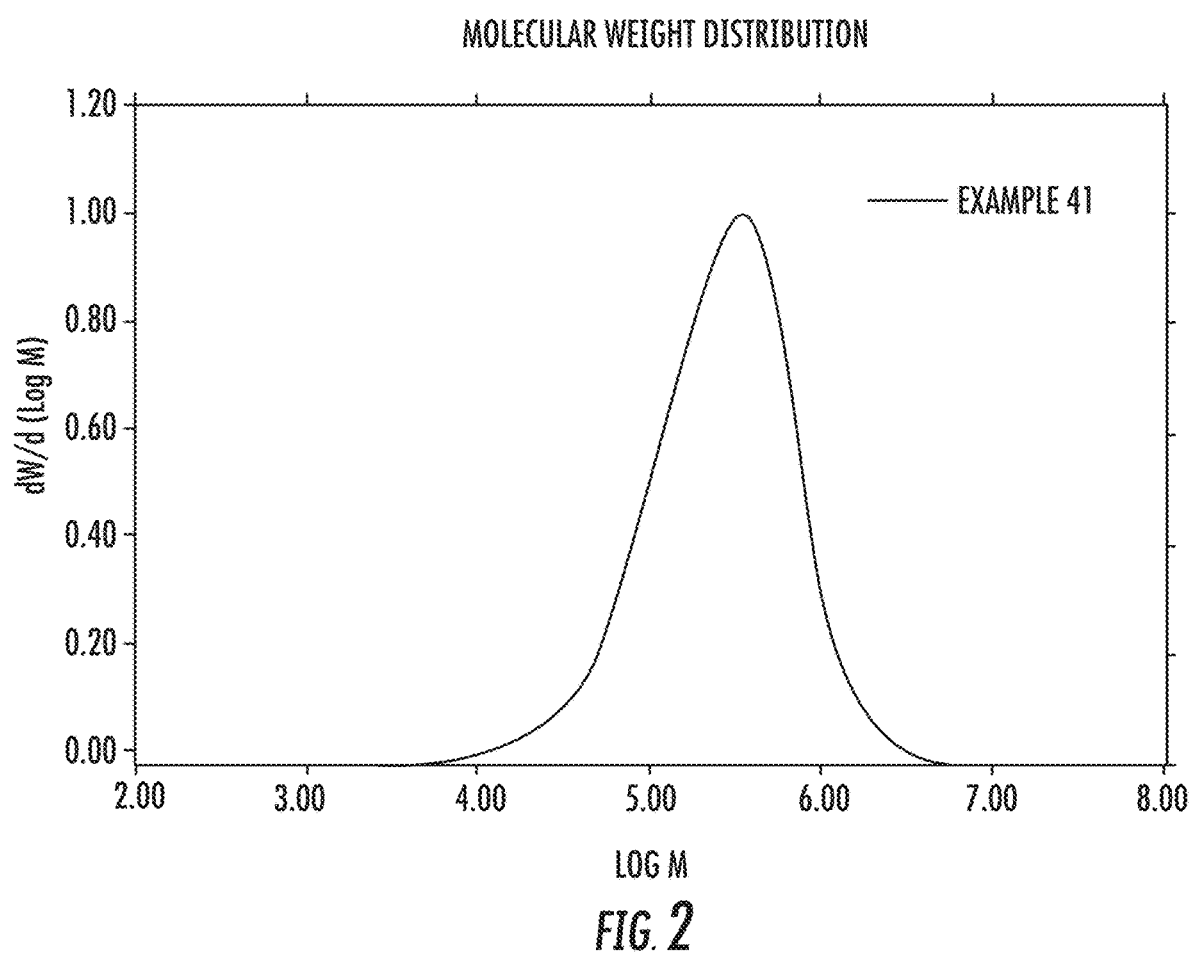
FIG. 2 provides a GPC trace showing the molecular weight distribution for LDPE samples prepared according to Example 41, where sample identification is correlated to Table 1 and Table 4.

The following polymer analytical data characterizes the LDPE produced according to the above examples, where the Example numbers correlate to Table 1 and Table 4, and the corresponding sample identification (ID) numbers correlate to the data presented graphically in the figures of this disclosure. Thus, the GPC traces showing the molecular weight distribution for LDPE polymer samples are presented in FIG. 1, with Examples 35-39, 42 and 40, respectively, shown in order of increasing peak molecular weight. Similarly, FIG. 2 provides a GPC trace showing the molecular weight distribution for LDPE samples prepared according to Example 41.

Figure 3:
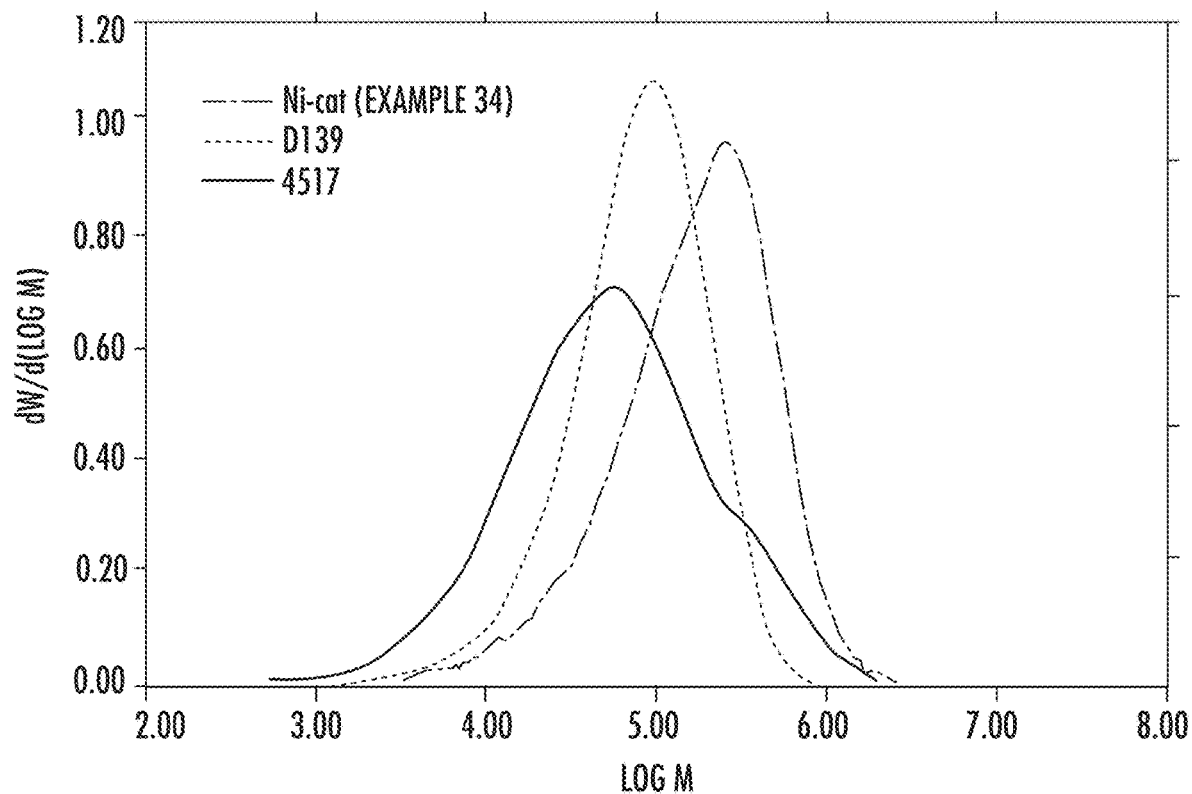
FIG. 3 presents GPC traces comparing the molecular weight distributions of the LDPE prepared according to Example 34, with samples of a mLLPDE (metallocene-catalyzed linear low-density polyethylene, D139) and a conventional LLDPE (4517). Molecular weight and polydispersity data are provided at the bottom of FIG. 3.
Figure 4:
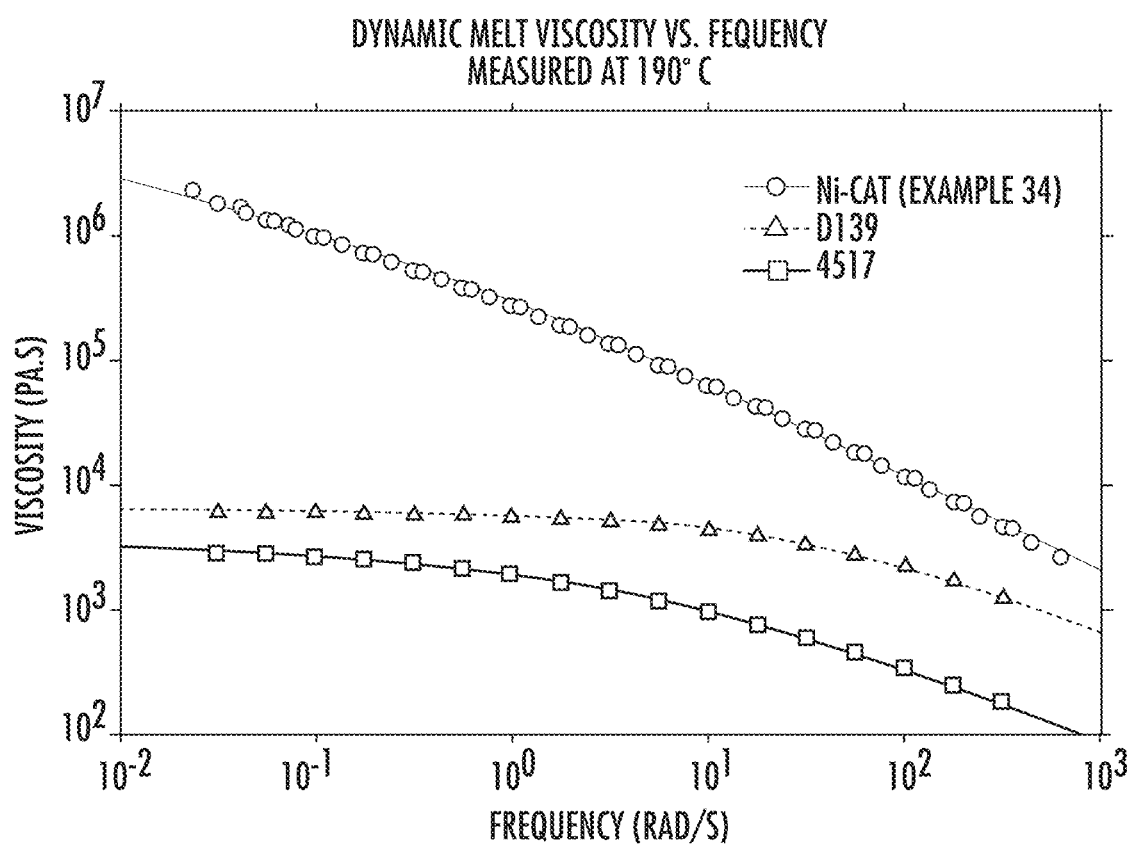
FIG. 4 presents the frequency (measured at 190° C.) versus dynamic melt viscosity, for samples of the LDPE prepared according to Example 34, with samples of a mLLPDE and a LLDPE, as shown in FIG. 3.
Figure 5:
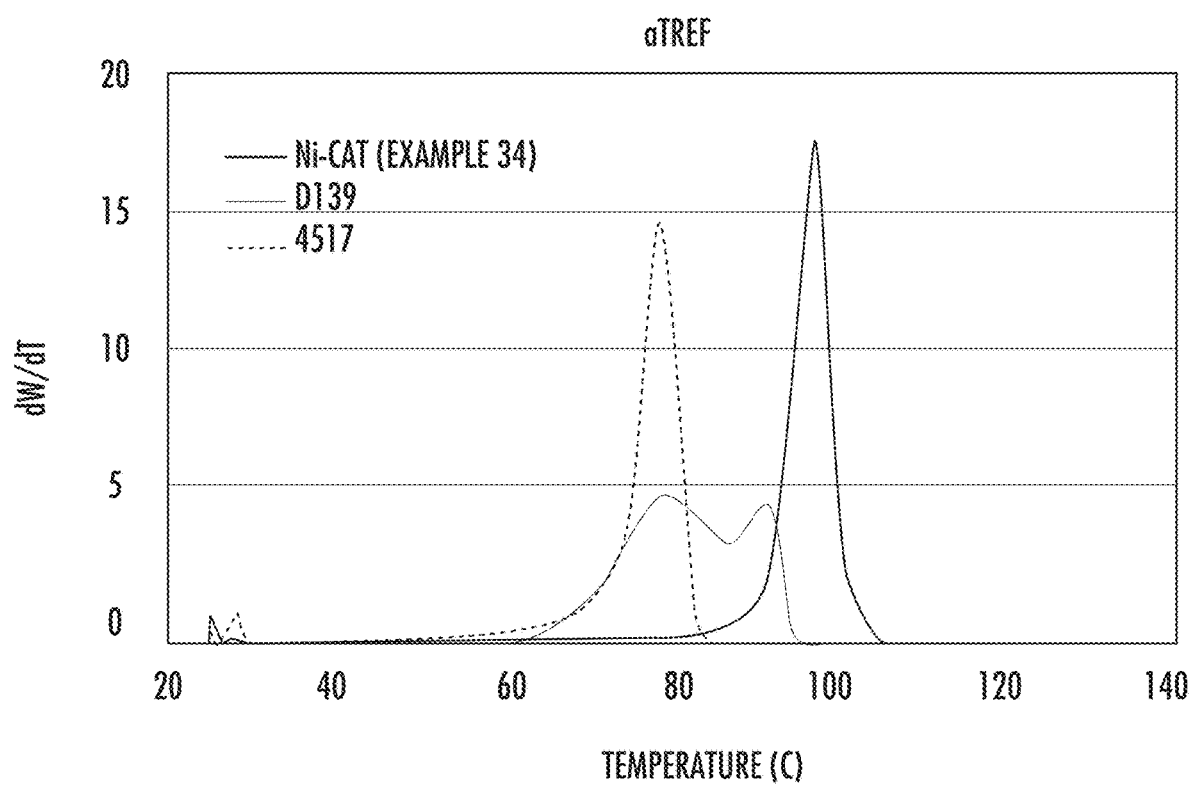
FIG. 5 presents an aTREF plot (Temperature Rising Elution Fractionation) of temperature versus dW/dT for samples of the LDPE prepared according to Example 34, with samples of a mLLPDE (D139) and a conventional LLDPE (4517), as shown in FIG. 3.
Figure 6:
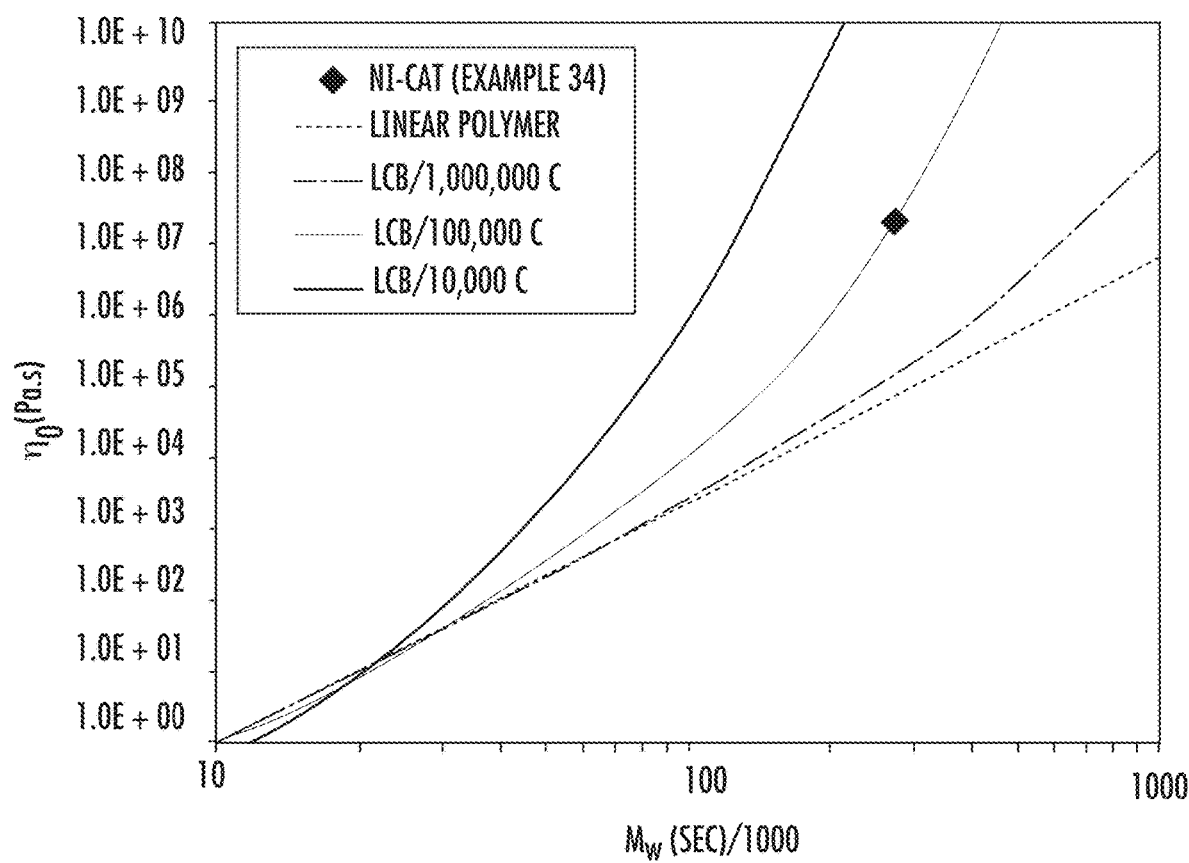
FIG. 6 compares the long-chain branching profile of the polymer samples of the LDPE prepared according to Example 34, with standard polymers having various levels of long chain branching, showing a plot of $\eta_0$(Pa·s) versus Mw/1000 via size exclusion chromatography for the samples.
Figure 7:
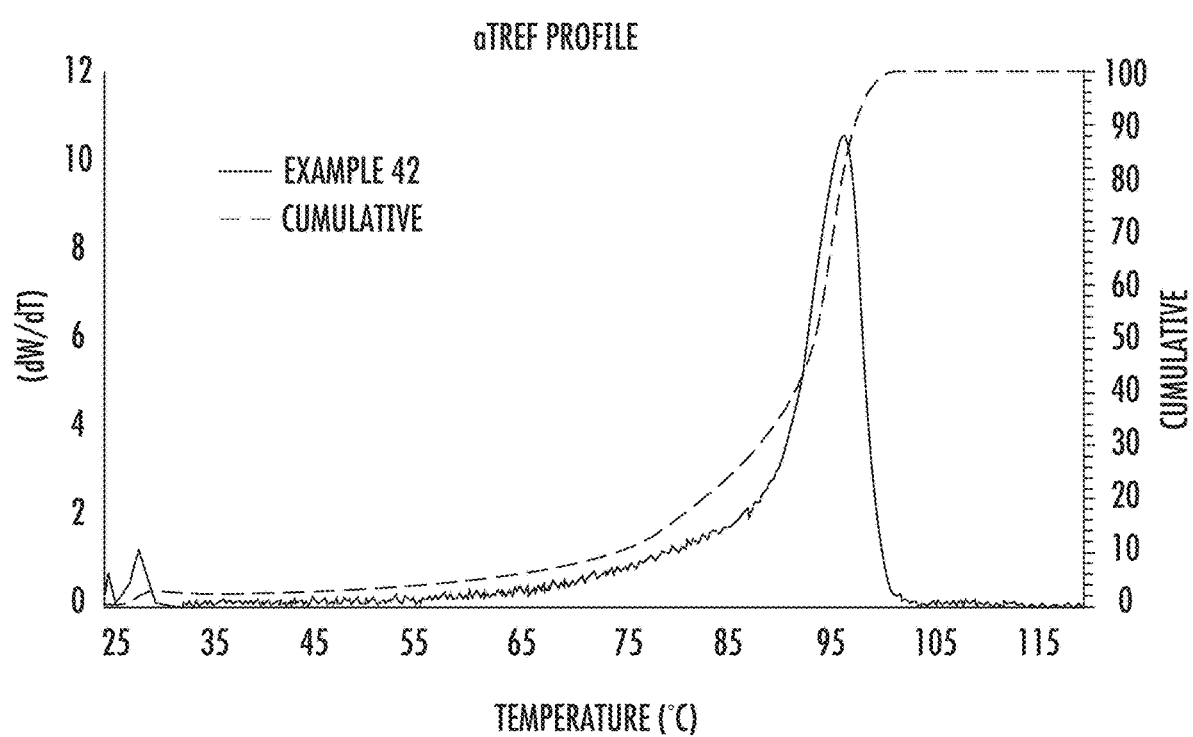
FIG. 7 presents an aTREF plot of temperature versus dW/dT for samples of the LDPE prepared according to Example 42, along with the cumulative weight fraction versus temperature.

As shown in FIG. 3, the molecular weight distribution of the LDPE prepared according to Example 34 is compared with the molecular weight distributions of samples of a mLLPDE (metalloceite-catalyzed linear low-density polyethylene) and a conventional LLDPE, with molecular weight and polydispersity data tabulated and presented below the GPC trace. The Example 34 LDPE sample is further characterized in FIG. 4, which presents the frequency (measured at 190° C.) versus dynamic melt viscosity for the Example 34 sample, again comparing this data with that of the metallocene-catalyzed linear low-density polyethylene (mLLPDE) and the conventional LLDPE also shown in FIG. 3. An aTREF plot (Temperature Rising Elution Fractionation) of temperature versus dW/dT for samples of the LDPE prepared according to Example 34, and for samples of the mLLPDE and the LLDPE is illustrated at FIG. 5. FIG. 6 compares the long-chain branching profile of the polymer samples of the LDPE prepared according to Example 34, with standard polymers having various levels of long chain branching, showing a plot of $\eta_0$(Pa·s) versus Mw/1000 via size exclusion chromatography for the samples. FIG. 7 presents an aTREF plot of temperature versus dW/dT for samples of the LDPE prepared according to Example 42, along with the cumulative weight fraction versus temperature.

Again, the sample identification numbers in the Figures are correlated to the Example numbers and information provided in Table 1 and Table 4.

Figure 8:
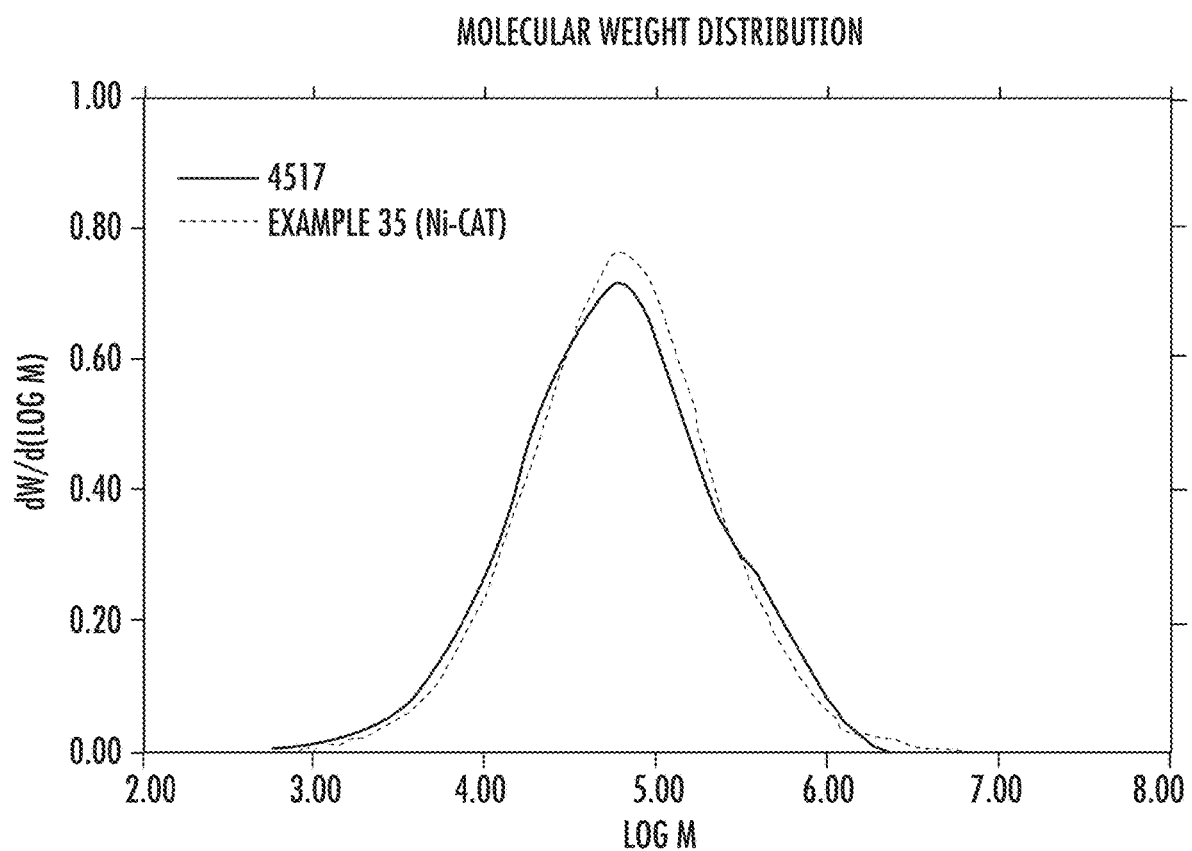
FIG. 8 presents GPC traces comparing the molecular weight distributions of the nicke-catalyzed LDPE prepared according to Example 35, with samples of a conventional LLDPE. Molecular weight and polydispersity data are provided at the bottom of FIG. 8.
Figure 9:
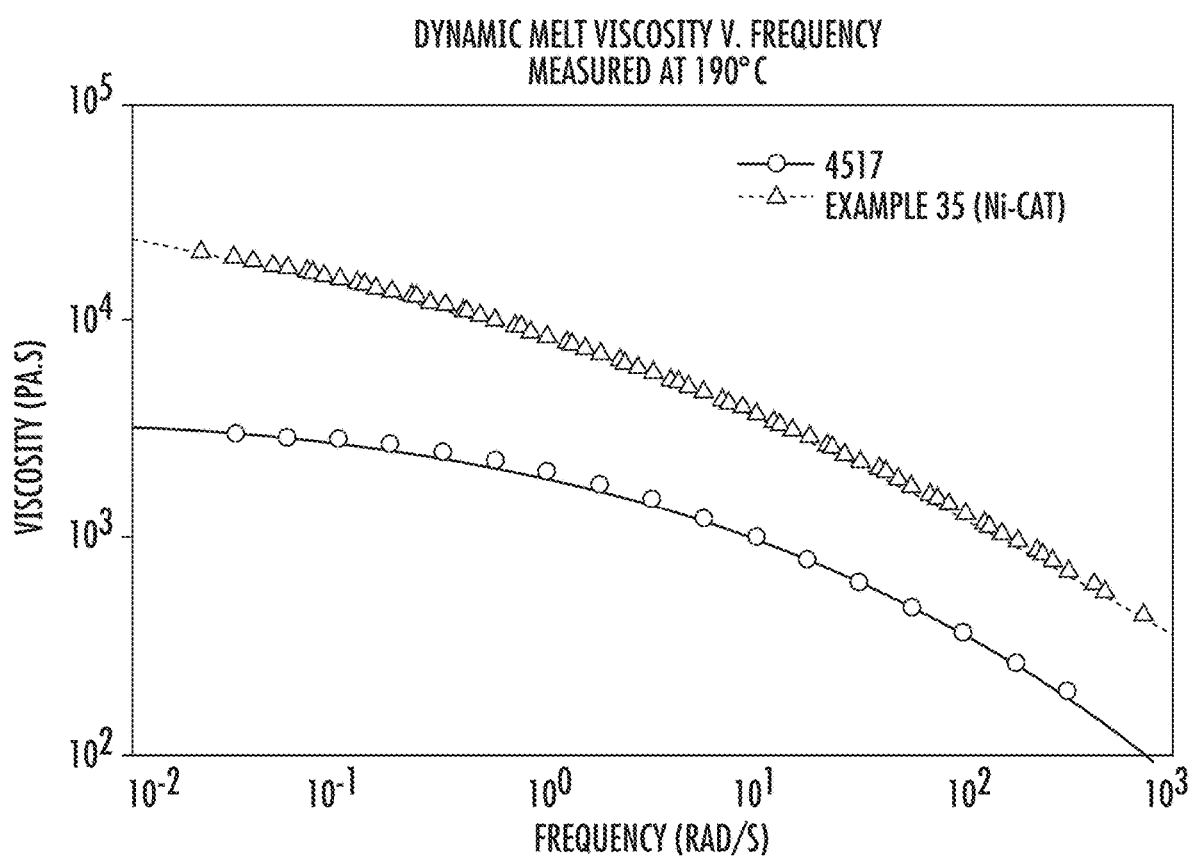
FIG. 9 presents the frequency (measured at 190° C.) versus dynamic melt viscosity, for samples of the LDPE prepared according to Example 35, with a sample of a conventional LLDPE.
Figure 10:
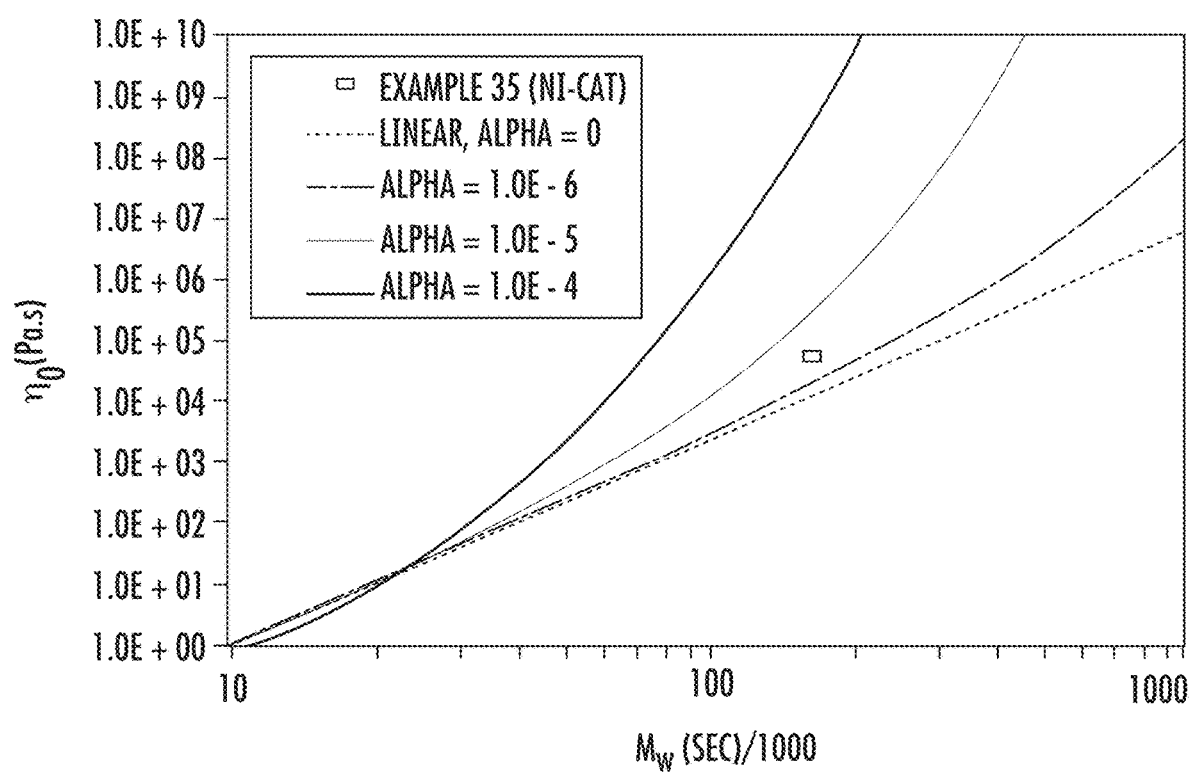
FIG. 10 illustrates a comparison of the long-chain branching profile of the polymer samples of the nickel-catalyzed LDPE prepared according to Example 35, with standard polymers having various molecular weights, using a plot of $\eta_0$(Pa·s) versus Mw/1000 via size exclusion chromatography for the samples.

FIG. 8 presents GPC traces comparing the molecular weight distributions of the LDPE of Example 35 with samples of a conventional LLDPE. FIG. 9 illustrates the frequency (measured at 190° C.) versus dynamic melt viscosity, for samples of the LDPE prepared according to Example 35, with a sample of a conventional LLDPE. FIG. 10 compares the long-chain branching profile of the polymer samples of the nickel-catalyzed LDPE prepared according to Example 35, with standard polymers having various molecular weights, using a plot of $\eta_0$(Pa·s) versus Mw/1000 via size exclusion chromatography for the samples.

TABLE 6

Polymer analysis data

| Example | Sample ID | Catalyst (Example) & Ligand | Mn/1000 | Mw/1000 | Mz/1000 | Mv/1000 | Mp/1000 | Mw/Mn | IB | IVc | MP (° C.) | ΔH (J/g) |
|---|---|---|---|---|---|---|---|---|---|---|---|---|
| 35 | — | Ex. 19 Dipip | 24.85 | 165.83 | 1595.35 | 122.32 | 60.14 | 6.67 | 1.315 | 1.95 | 124.1 | 149.3 |
| 36 | — | Ex. 20 Mesmes | 49.6 | 191.06 | 533.03 | 163.97 | 110.3 | 3.85 | 1.207 | 2.413 | 128.3 | 169.9 |
| 37 | — | Ex. 21 Mipmip | 78.51 | 268.55 | 777.59 | 232.02 | 185.03 | 3.42 | 1.153 | 3.104 | 122.9 | 131.1 |
| 38 | — | Ex. 22 Metmet | 87.53 | 277.97 | 724.95 | 242.6 | 187.38 | 3.18 | 1.143 | 3.206 | 125.3 | 147.4 |
| 39 | — | Ex. 23 Dipmes | 97.05 | 314.17 | 898.15 | 271.39 | 202.13 | 3.24 | 1.147 | 3.478 | 122.6 | 129.1 |
| 40 | — | Ex. 24 Dipmip | 121.73 | 369.47 | 899.99 | 325.17 | 322.98 | 3.04 | 1.081 | 3.966 | 120.6 | 113.5 |
| 41 | — | Ex. 25 Detdet | 128.05 | 385.99 | 837.08 | 344.30 | 337.85 | 3.01 | 1.006 | 4.134 | 124.0 | 131.4 |
| 42 | — | Ex. 27 21 cat mix | 97.4 | 355.44 | 1023.07 | 306.52 | 303.11 | 3.65 | 1.166 | 3.8 | 122.7 | 124.2 |
| 34 | — | Ex. 26 Detdet DEAC | 88.8 | 273.3 | 529.2 | | | 3.1 | | | | |
| 43 | D139 mLLDPE | — | 48.4 | 116.8 | 205.4 | | | 2.4 | | | | |
| 44 | 4517 LDPE | — | 21.1 | 131.5 | 467.6 | | | 6.2 | | | | |

Referring to the Example 35 polymer analysis data presented in Table 6, and referencing the catalyst and second activator (support) combinations provided in Table 1, the following analytical data for the nickel-catalyzed low-density polyethylene (LDPE) produced in Example 35 is set out in Table 7. A comparison with conventional LDPE is also presented this table.

TABLE 7

Analysis of polyethylene produced in Example 35, including branching as determined by $^{13}$C NMR

| ID | MI | HLMI | Density (g/cc) | Flow Activation Energy Ea (KJ/mol) |
|---|---|---|---|---|
| Ex. 35 | 0.83 | 37.4 | 0.9335 | 34 |
| 4517 (LDPE) | 5 | N/A | 0.9230 | 53 |

| ID | Methyl Branching (wt %) | Ethyl Branching (wt %) | Butyl Branching (wt %) |
|---|---|---|---|
| Ex. 35 | 2.86 | 0.33 | 0.17 |

The nickel-catalyzed LDPE prepared according to Example 35 is characterized in FIG. 8, FIG. 9 and FIG. 10.

Examples 45-51 and comparative Example 52 are presented in Table 8, including polymerization data and conditions used to prepare these polyethylenes. Reference is made to Table 1 for the catalyst and second activator (support) combinations. With the exception of Examples 45 and 46, the Table 8 examples were prepared using a higher loading of nickel on the solid support, as compared to the Examples of Table 1. The supported catalysts of Examples 45-51 were prepared by an analogous method as described for Examples 19-27. As Table 8 indicates, all of the reported polymerizations were run using the catalyst complex of Example 15 (using the dipip ligand). The polymerization runs in Table 8 were performed according to the nickel catalyzed polyethylene batch reaction procedure described herein.

Gel permeation chromatography (GPC) were obtained for the Examples 46-51 polymers, and the GPC data are reported in Table 9.

TABLE 8

Polymerization data and conditions used to prepare nickel catalyzed low density polyethylenes.[A]

| | Example | | | | | | | |
|---|---|---|---|---|---|---|---|---|
| | 45 | 46 | 47 | 48 | 49 | 50 | 51 | 52 |
| Ni complex, nickname (ligand) | dipip (Ex. 15) | dipip (Ex. 15) | dipip (Ex. 15) | dipip (Ex. 15) | dipip (Ex. 15) | dipip (Ex. 15) | dipip (Ex. 15) | Zr Ansa-metallocene |
| MW catalyst | 472 | 472 | 472 | 472 | 472 | 472 | 472 | 432 |
| % metal in supported catalyst (target)see Note A | 0.30 | 0.50 | 0.75 | 1.00 | 1.00 | 1.00 | 1.00 | 0.50 |
| mass catalyst (mg) | 2.03 | 2.11 | 2.09 | 2.11 | 3.21 | 4.23 | 3.21 | 1.99 |
| mass TiBAl cocatalyst (mg) | 78 | 78 | 78 | 78 | 117 | 156 | 117 | 100 |
| mass mullite (mg) | 78.0 | 47.9 | 30.9 | 22.9 | 34.8 | 45.8 | 34.8 | 82.0 |
| psig ethylene | 150 | 300 | 300 | 300 | 300 | 300 | 300 | 300 |
| Initial Temp (C.) | 20 | 21 | 19 | 22 | 20 | 20 | 21 | 20 |
| Final Temp (C.) | 60 | 58 | 58 | 58 | 58 | 53 | 59 | 53 |
| Max Temp (C.) | 60 | 62 | 60 | 61 | 64 | 64 | 61 | 53 |
| Solids mass (g) | 20.37 | 30.37 | 22.11 | 17.8 | 37.93 | 54.22 | 20.34 | 14.1 |
| catalyst metal | Ni | Ni | Ni | Ni | Ni | Ni | Ni | Zr |
| g product/g Ni | 84875 | 121480 | 89333 | 71200 | 99816 | 108440 | 53526 | 33619 |
| g product/g mullite | 261 | 634 | 715 | 778 | 1090 | 1185 | 585 | 172 |
| g product/g TIBA | 261 | 389 | 283 | 228 | 324 | 348 | 174 | 141 |
| mg TIBA/mg mullite | 1.0 | 1.6 | 2.5 | 3.4 | 3.4 | 3.4 | 3.4 | 1.2 |
| % mullite in final product | 0.38 | 0.16 | 0.14 | 0.13 | 0.09 | 0.08 | 0.17 | 0.58 |

[A]The same method was used to support the Nickel complexes and metallocenes as presented in Examples 19-27. All reactions were run in 200 mL of n-pentane solvent, with a 60 minute reaction time.

TABLE 9

Gel permeation chromatography (GPC) data for polymers of Examples 46-51

| Example | Mn/1000 | Mw/1000 | Mz/1000 | Mv/1000 | Mp/1000 | Mw/Mn | IB | IVc |
|---|---|---|---|---|---|---|---|---|
| 46 | 23.37 | 121.51 | 477.72 | 98.78 | 66.43 | 5.2 | 1.299 | 1.67 |
| 47 | 24.99 | 122.49 | 454.96 | 100.46 | 63.09 | 4.9 | 1.281 | 1.691 |
| 48 | 25.04 | 120.41 | 425.7 | 99 | 65.58 | 4.81 | 1.293 | 1.673 |
| 49 | 20.22 | 118.32 | 511.58 | 95.06 | 58.38 | 5.85 | 1.347 | 1.624 |
| 50 | 21.71 | 115.13 | 437.25 | 93.88 | 58.38 | 5.3 | 1.303 | 1.61 |
| 51 | 22.08 | 115.59 | 471.65 | 93.55 | 56.89 | 5.24 | 1.34 | 1.605 |

Figure 11:
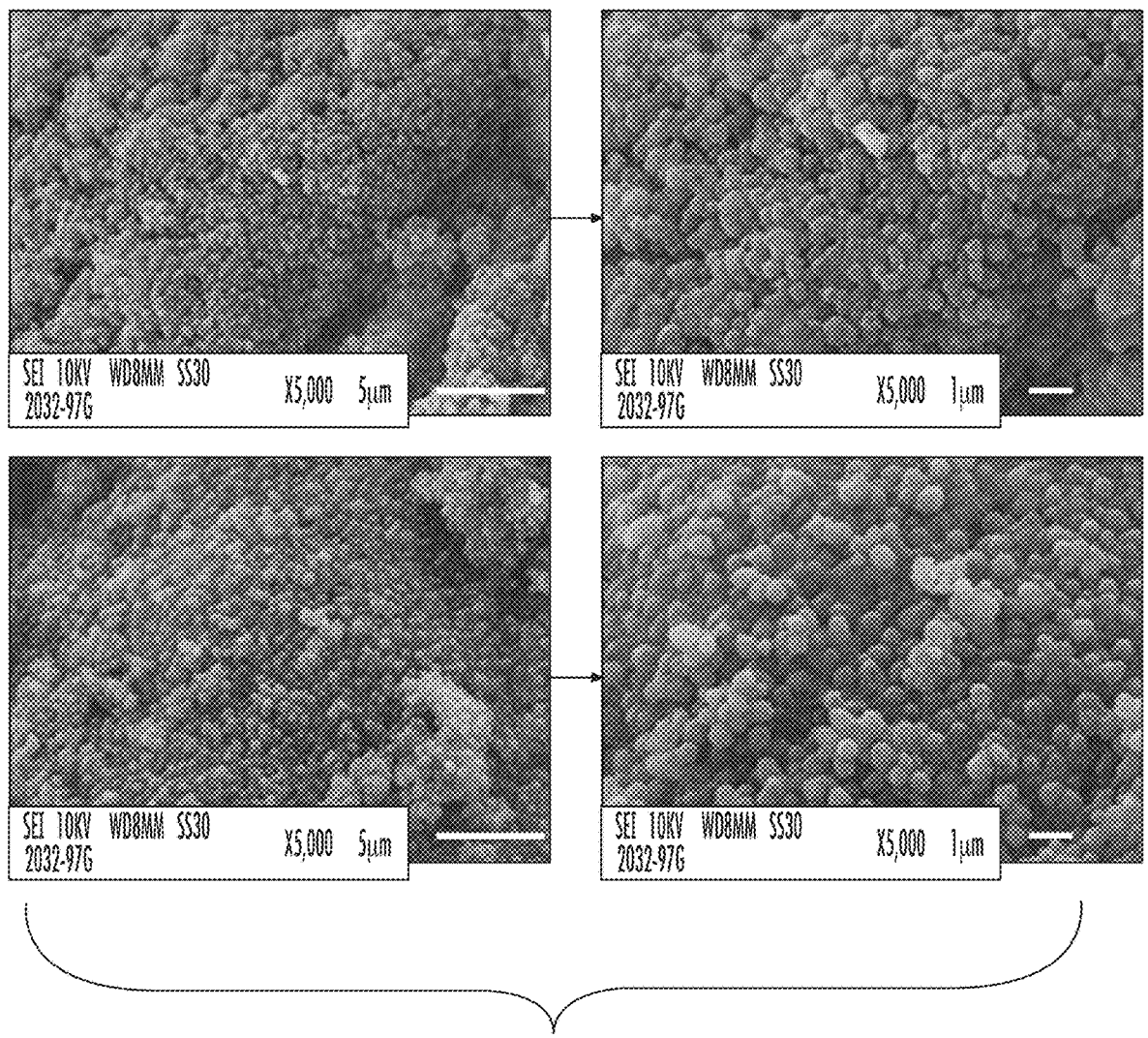
FIG. 11 shows a scanning electron microscope (SEM) micrograph obtained for the polymer made in Examples 45.
Figure 12:
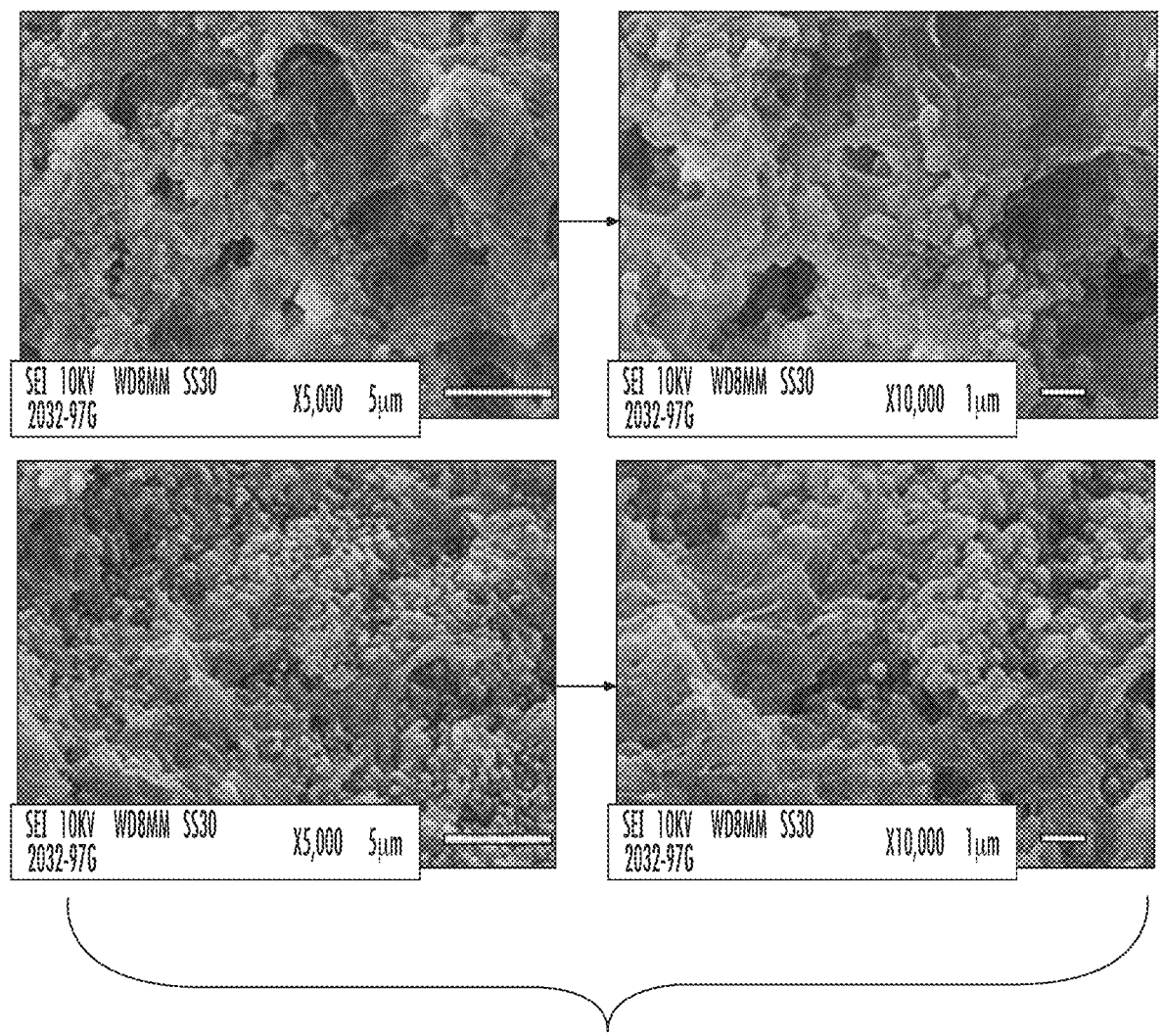
FIG. 12 presents a scanning electron microscope (SEM) micrograph obtained for the polymer made in Examples 49.
Figure 13:
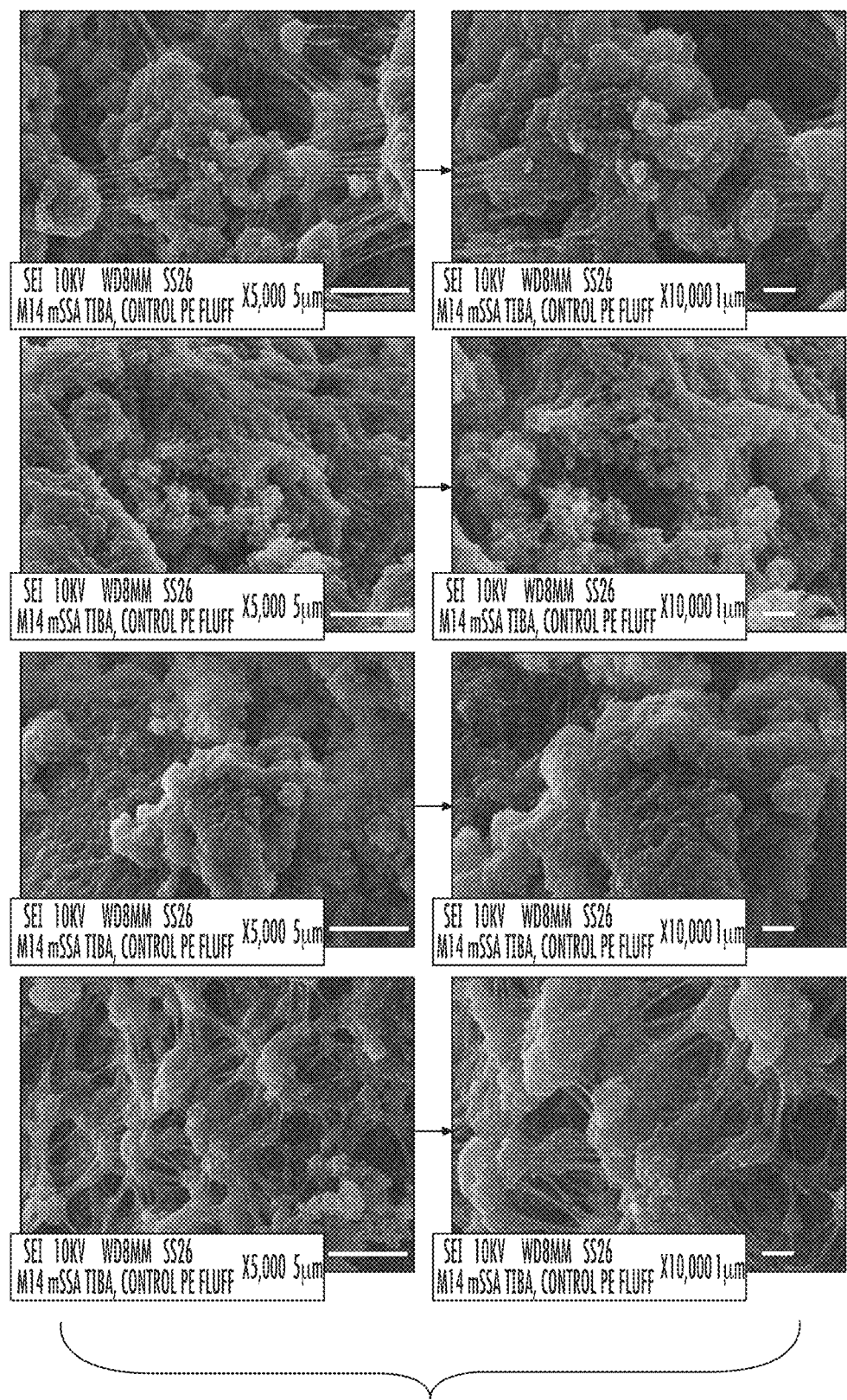
FIG. 13 presents a scanning electron microscope (SEM) micrograph obtained for a comparative polymer prepared using the metallocene and SSA catalyst system of Example 52. As this micrograph illustrates, the polymer particles made using the nickel system have a more spherical appearance as compared with the polymer particles made in this control run.

The polymers provided according to the methods of this disclosure were analyzed by scanning electron microscopy (SEM) and compared to the SEM micrograph for a metallocene catalyzed LDPE (mLDPE). Thus, FIG. 11 shows a SEM micrograph obtained for the polymer made in Examples 45, and FIG. 12 presents a SEM micrograph for the Examples 49 polymer. FIG. 13 presents a scanning electron microscope (SEM) micrograph obtained for a comparative polymer prepared using the metallocene and SSA catalyst system of Example 52. As this micrograph illustrates, the polymer particles made using the nickel system have a more spherical appearance as compared with the polymer particles made in this control run.

These and other aspects of the invention can further include the various embodiments that are presented below.

Selected Embodiments

Embodiment 1. A process for polymerizing an olefin, the process comprising:

a) providing a catalyst system comprising the contact product of:

1) a transition metal compound having formula (I):

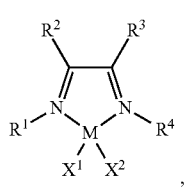

(I)

wherein

M is Ni, Pd, or Pt;

$X^1$ and $X^2$ are each independently a monoanionic ligand, or $X^1$ and $X^2$ taken together is a bidentate dianionic ligand;

$R^1$ and $R^4$ are each independently $C_1$ to $C_{20}$ hydrocarbyl or substituted hydrocarbyl; and $R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof; and 3) a second activator comprising a solid oxide chemically-treated with an electron withdrawing anion; and b) contacting the catalyst system with at least one olefin monomer comprising ethylene under polymerization conditions suitable to form a polyethylene.

Embodiment 2. A process for forming a catalyst system, the process comprising contacting in any order to form a catalyst system:

1) a transition metal compound having formula (I):

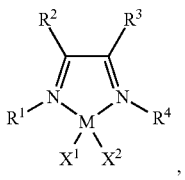

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof;

3) a second activator comprising a solid oxide chemically-treated with an electron withdrawing anion; and 4) optionally, at least one olefin monomer comprising ethylene.

Embodiment 3. A catalyst system comprising the contact product of:

1) a transition metal compound having formula (I):

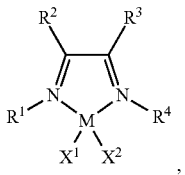

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;

2) a first activator comprising an organoaluminum compound, an organozinc compound, an organomagnesium compound, an organolithium compound, an organoboron or organoborate compound, an ionizing ionic compound, an aluminoxane compound, or any combination thereof;

3) a second activator comprising a solid oxide chemically-treated with an electron withdrawing anion; and 4) optionally, at least one olefin monomer comprising ethylene.

Embodiment 4. A process or a catalyst system according to any of embodiments 1-3, wherein the catalyst system comprising any catalyst system or combination of catalyst systems disclosed herein.

Embodiment 5. A process or a catalyst system according to any of embodiments 1-3, wherein M is Ni.

Embodiment 6. A process or a catalyst system according to any of embodiments 1-3, wherein M is Pd or Pt.

Embodiment 7. A process or a catalyst system according to any of embodiments 1-6, wherein:

$X^1$ and $X^2$ are each independently halide, hydride, $C_1$ to $C_{20}$ hydrocarbyl or $C_1$ to $C_{20}$ hydrocarbyloxide, or $X^1$ and $X^2$ taken together is $C_1$ to $C_{20}$ hydrocarbylenedioxide;

b) $X^1$ and $X^2$ are each independently chloride, bromide, iodide, hydride, $C_1$ to $C_{20}$ hydrocarbyl, or $C_1$ to $C_{20}$ hydrocarbyloxide;

c) $X^1$ and $X^2$ are each independently chloride, bromide, hydride, or $C_1$-$C_4$ alkoxide; or d) $X^1$ and $X^2$ taken together is lactate, glycolate, salicylate, catecholate, oxalate or malonate.

Embodiment 8. A process or a catalyst system according to any of embodiments 1-6, wherein $X^1$ and $X^2$ are each independently chloride.

Embodiment 9. A process or a catalyst system according to any of embodiments 1-8, wherein $R^1$ and $R^4$ are each independently an aryl or substituted aryl.

Embodiment 10. A process or a catalyst system according to any of embodiments 1-8, wherein $R^1$ and $R^4$ are each independently a 2,6-disubstituted aryl or a 2,4,6-trisubstituted aryl, and wherein any substituent is independently a $C_1$ to $C_{12}$ hydrocarbyl.

Embodiment 11. A process or a catalyst system according to any of embodiments 1-8, wherein $R^1$ and $R^4$ are each independently phenyl, 2,4,6-trimethylphenyl (mesityl), 2,6-diethylphenyl, 2,6-diisopropylphenyl, 2-ethyl-6-methylphenyl, 2-isopropyl-6-methylphenyl, 2-isopropyl-6-ethylphenyl, 2-methylphenyl, 2-ethylphenyl, 2-isopropylphenyl, 2,6-diisopropyl-4-benzylphenyl, 2,6-diisopropyl-4-(1,1-dimethylbenzyl)phenyl, 4-methylphenyl, or 2-t-butylphenyl.

Embodiment 12. A process or a catalyst system according to any of embodiments 1-11, wherein $R^2$ and $R^3$ are each independently hydrogen or $C_1$ to $C_{20}$ hydrocarbyl or substituted hydrocarbyl.

Embodiment 13. A process or a catalyst system according to any of embodiments 1-11, wherein $R^2$ and $R^3$ are each independently hydrogen, methyl, ethyl, or an aryl or substituted aryl.

Embodiment 14. A process or a catalyst system according to any of embodiments 1-11, wherein $R^2$ and $R^3$ taken together is $C_6$ to $C_{20}$ hydrocarbylene or substituted hydrocarbylene to form a carbocyclic ring.

Embodiment 15. A process or a catalyst system according to any of embodiments 1-11, wherein $R^2$ and $R^3$ taken together is a substituted or unsubstituted group having the formula:

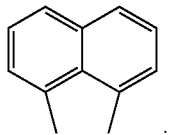

Embodiment 16. A process or a catalyst system according to any of embodiments 1-3, wherein the

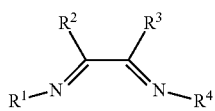

ligand of the transition metal compound is

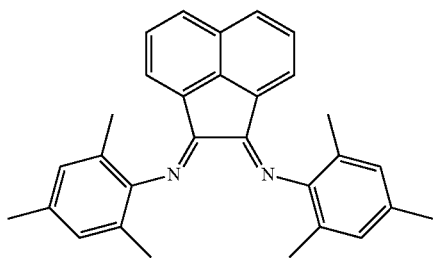

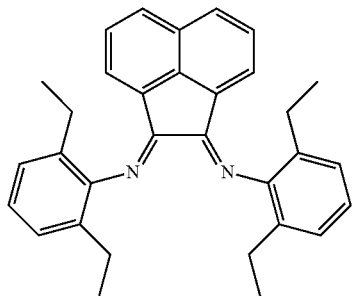

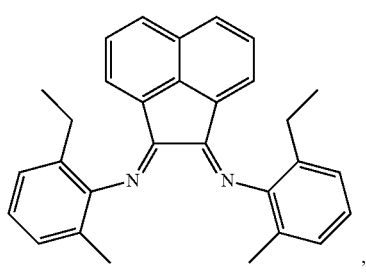

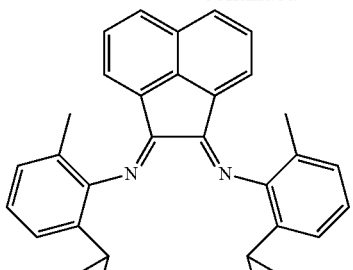

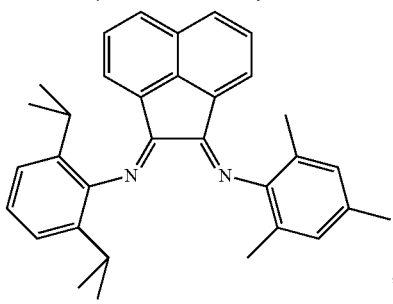

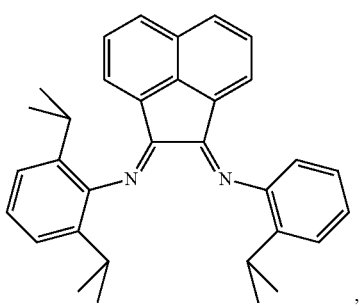

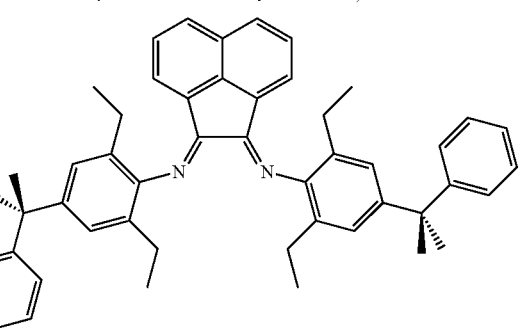

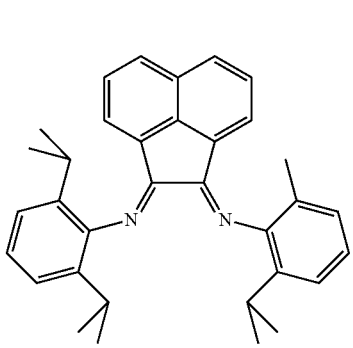

or any combination thereof.

Embodiment 17. A process or a catalyst system according to any of embodiments 1-3, wherein the transition metal compound is

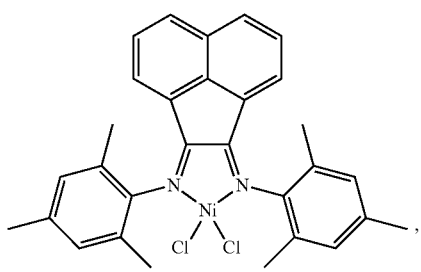

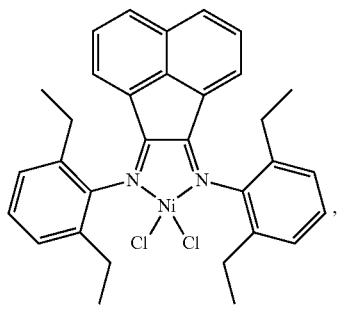

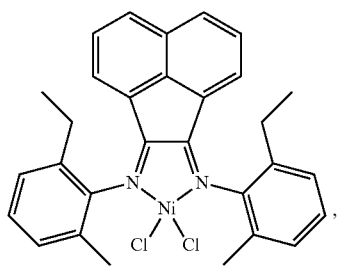

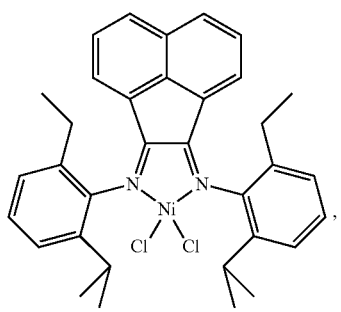

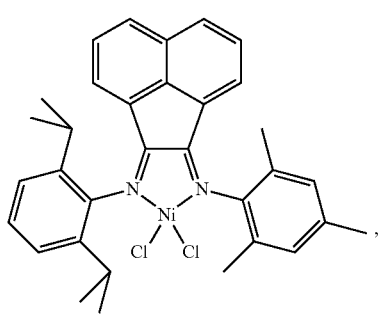

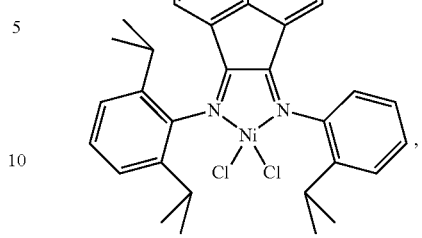

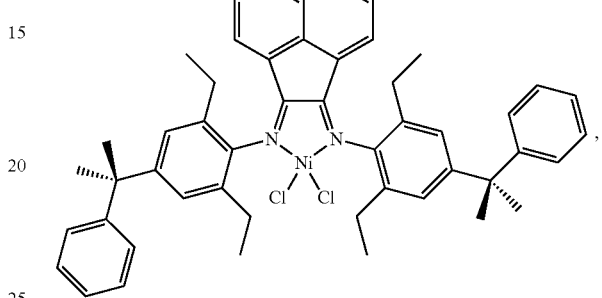

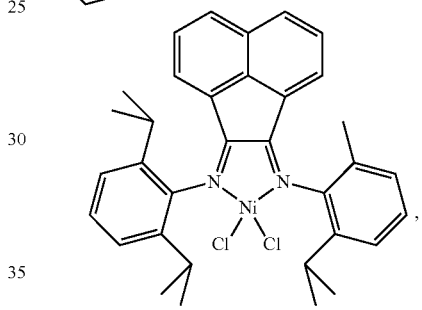

or any combination thereof.

Embodiment 18. A process or a catalyst system according to any of embodiments 1-17, wherein the first activator comprises any first activator or combination of first activators disclosed herein.

Embodiment 19. A process or a catalyst system according to any of embodiments 1-17, wherein the first activator comprises an organoaluminum compound, an organozinc compound, an organomagnesium compound, an organolithium compound, or any combination thereof.

Embodiment 20. A process or a catalyst system according to any of embodiments 1-17, wherein:
a) the first activator has a general formula:
 i) $M^1(X^3)_n(X^4)_{3-n}$, wherein $M^1$ is boron or aluminum and n is from 1 to 3 inclusive;
 ii) $M^2(X^3)_n(X^4)_{2-n}$, wherein $M^2$ is magnesium or zinc and n is from 1 to 2 inclusive; or
 iii) $M^3X^3$, wherein $M^3$ is Li;
b) $X^3$ is independently hydride or a $C_1$ to $C_{20}$ hydrocarbyl; and
c) $X^4$ is independently a halide, a hydride, a $C_1$ to $C_{20}$ hydrocarbyl, or a $C_1$ to $C_{20}$ hydrocarbyloxide.

Embodiment 21. A process or a catalyst system according to any of embodiments 1-17, wherein the first activator comprises any organoaluminum compound disclosed herein.

Embodiment 22. A process or a catalyst system according to any of embodiments 1-17, wherein the first activator comprises any organoaluminum compound having a formula $Al(X^3)_n(X^4)_{3-n}$, wherein $X^3$ is independently a $C_1$ to $C_{20}$ hydrocarbyl, $X^4$ is independently a halide, a hydride, or a $C_1$ to $C_{20}$ hydrocarboxide, and n is from 1 to 3 inclusive.

Embodiment 23. A process or a catalyst system according to any of embodiments 1-17, wherein the first activator comprises an organoaluminum compound and wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 24. A process or a catalyst system according to any of embodiments 1-17, wherein the catalyst system is substantially free of aluminoxane compounds, organoboron or organoborate compounds, ionizing ionic compounds, or combinations thereof.

Embodiment 25. A process or a catalyst system according to any of embodiments 1-17, wherein the catalyst system is substantially free of aluminoxane compounds.

Embodiment 26. A process or a catalyst system according to any of embodiments 1-17, wherein the first activator comprises an aluminoxane compound.

Embodiment 27. A process or a catalyst system according to any of embodiments 1-26, wherein second activator comprising a solid oxide chemically-treated with an electron withdrawing anion is any solid oxide or combinations of solid oxides disclosed herein, chemically-treated with any electron-withdrawing anion or combinations of electron-withdrawing anions disclosed herein.

Embodiment 28. A process or a catalyst system according to any of embodiments 1-26, wherein solid oxide of the second activator is silica, alumina, silica-alumina, aluminum phosphate, mullite, boehmite, heteropolytungstates, titania, zirconia, magnesia, boria, zinc oxide, silica-zirconia, silica-titania, or any mixed oxides thereof, or any combination thereof; or alternatively, silica-alumina, mullite, silica-zirconia, silica-titania, or any combination thereof.

Embodiment 29. A process or a catalyst system according to any of embodiments 1-26, wherein the electron withdrawing anion of the second activator is fluoride, chloride, bromide, iodide, phosphate, trifluoroacetate, triflate, sulfate, bisulfate, fluorosulfate, fluorophosphate, fluoroborate, fluorozirconate, fluorotitanate, or any combination thereof.

Embodiment 30. A process or a catalyst system according to any of embodiments 1-26, wherein solid oxide chemically-treated with an electron withdrawing anion is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided mullite, chlorided mullite, bromided mullite, sulfated mullite, or any combination thereof.

Embodiment 31. A process or a catalyst system according to any of embodiments 1-26, wherein the solid oxide chemically-treated with an electron withdrawing anion comprises at least one solid oxide treated with at least two electron-withdrawing anions, and wherein the at least two electron-withdrawing anions comprise fluoride and phosphate, fluoride and sulfate, chloride and phosphate, chloride and sulfate, triflate and sulfate, or triflate and phosphate.

Embodiment 32. A process or a catalyst system according to any of embodiments 1-26, wherein the solid oxide chemically-treated with an electron withdrawing anion has a surface area from about 100 $m^2/g$ to about 1000 $m^2/g$, a pore volume from about 0.25 mL/g to about 3.0 mL/g, and a particle size from about 5 microns to about 150 microns.

Embodiment 33. A process or a catalyst system according to any of embodiments 1-26, wherein the second activator comprising a solid oxide chemically-treated with an electron withdrawing anion has a pore volume from about 0.5 mL/g to about 2.5 mL/g.

Embodiment 34. A process or a catalyst system according to any of embodiments 1-26, wherein the second activator comprising a solid oxide chemically-treated with an electron withdrawing anion has a surface area from about 150 $m^2/g$ to about 700 $m^2/g$.

Embodiment 35. A process or a catalyst system according to any of the preceding embodiments, wherein the at least one olefin monomer and the catalyst system are contacted under any one or any combination of more than one of the following conditions:

a) the molar ratio of the first activator to the transition metal compound is from about 20:1 to about 500:1;

b) the weight ratio of the second activator to the transition metal compound is from about 5:1 to about 1,000:1; and/or c) the weight ratio of the at least one olefin monomer to the transition metal compound is from about 1,000:1 to about 100,000,000:1.

Embodiment 36. A process or a catalyst system according to any of embodiments 1-3, wherein the at least one olefin monomer and the catalyst system are contacted under any one or any combination of more than one of the following conditions:

a) the first activator comprises an organoaluminum compound and the molar ratio of the first activator to the transition metal compound is from about 10:1 to about 500:1;

b) the second activator comprises a fluorided silica-alumina or a fluorided mullite and the weight ratio of the second activator to the transition metal compound is from about 5:1 to about 1,000:1; and/or c) the weight ratio of the at least one olefin monomer to the transition metal compound is from about 1,000:1 to about 100,000,000:1.

Embodiment 37. A process or a catalyst system according to any of the preceding embodiments, wherein the polymerization conditions comprise any one or any combination of more than one of the following conditions:

a) a temperature range from about 40° C. to about 120° C.;

b) a partial pressure of the olefin monomer comprising ethylene from about 15 psi to about 1500 psi; and/or c) a time of the contacting step of from about 1 minute to about 3 hours.

Embodiment 38. A process or a catalyst system according to any of the preceding embodiments, wherein the polymerization conditions comprise any one or any combination of more than one of the following conditions:

a) a temperature range from about 55° C. to about 120° C.;

b) a partial pressure of the olefin monomer comprising ethylene from about 15 psi to about 1000 psi; and/or c) a time of the contacting step of from about 0.5 hour to about 3 hours.

Embodiment 39. A process or a catalyst system according to any of the preceding embodiments, wherein the polymerization conditions comprise any one or any combination of more than one of the following conditions:

a) a temperature range from about 65° C. to about 120° C.;

b) a partial pressure of the olefin monomer comprising ethylene from about 30 psi to about 1000 psi; and/or c) a time of the contacting step of from about 0.75 hour to about 3 hours.

Embodiment 40. A process or a catalyst system according to any of the preceding embodiments, wherein the polymerization conditions comprise any one or any combination of more than one of the following conditions:

a) a temperature range from about 70° C. to about 120° C.;
b) a partial pressure of the olefin monomer comprising ethylene from about 45 psi to about 1000 psi; and/or
c) a time of the contacting step of from about 1 hour to about 3 hours.

Embodiment 41. A process for polymerizing an olefin according to any of embodiments 1 and 4-26, wherein the polymerization conditions comprise contacting the catalyst system with at least one olefin monomer in the presence of a diluent comprising bulk polymerizations, propane, iso-butane, n-pentane, iso-pentane, heptane, hexane or a combination thereof.

Embodiment 42. A process for polymerizing an olefin according to any of embodiments 1 and 4-26, wherein the at least one olefin monomer further comprises at least one $C_3$ to $C_{20}$ olefin comonomer.

Embodiment 43. A process for polymerizing an olefin according to any of embodiments 1 and 4-26, wherein the at least one olefin monomer further comprises at least one olefin comonomer, the comonomer comprising propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a combination thereof.

Embodiment 44. A process for polymerizing an olefin according to any of embodiments 1 and 4-26, wherein the step of providing a catalyst system further comprises providing the contact product in a solvent.

Embodiment 45. A process for forming a catalyst system according to any of embodiments 2 and 4-26, wherein the step of contacting is carried out in a solvent.

Embodiment 46. A process or a catalyst system according to any of embodiments 1-26, wherein the first activator and the second activator are contacted in a solvent prior to contact with the transition metal compound.

Embodiment 47. A process or a catalyst system according to any of embodiments 1-26, wherein the first activator, the second activator, and the at least one olefin monomer comprising ethylene are contacted in a solvent prior to contact with the transition metal compound.

Embodiment 48. A process or a catalyst system according to any of embodiments 1-26, wherein the first activator and the transition metal compound are contacted in a solvent in the presence or absence of the at least one olefin monomer comprising ethylene, prior to contacting with the second activator.

Embodiment 49. A process or a catalyst system according to any of embodiments 1-26, wherein the second activator and the transition metal compound are contacted in a solvent in the presence or absence of the at least one olefin monomer comprising ethylene, prior to contacting with the first activator.

Embodiment 50. A process for polymerizing an olefin according to any of embodiments 1 and 4-34, wherein the polymerization process is conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof.

Embodiment 51. A process for polymerizing an olefin according to any of embodiments 1 and 4-44, wherein the polymerization process is conducted in a polymerization reactor system comprises a loop slurry reactor.

Embodiment 52. A process for polymerizing an olefin according to any of embodiments 1 and 4-44, wherein the polymerization process is conducted in a polymerization reactor system comprising a single reactor.

Embodiment 53. A process for polymerizing an olefin according to any of embodiments 1 and 4-44, wherein the polymerization process is conducted in a polymerization reactor system comprising two or more reactors.

Embodiment 54. A process for polymerizing an olefin according to any of embodiments 1 and 4-44, wherein the polymerization conditions suitable to form a polyethylene comprises a polymerization reaction temperature from about 60° C. to about 120° C. and a reaction pressure from about 200 psig to about 1000 psig (about 1.4 to about 6.9 MPa).

Embodiment 55. A process for polymerizing an olefin according to any of embodiments 1 and 4-44, wherein no hydrogen is added to the polymerization reactor system.

Embodiment 56. A process for polymerizing an olefin according to any of embodiments 1 and 4-44, wherein hydrogen is added to the polymerization reactor system.

Embodiment 57. A process for polymerizing an olefin according to any of embodiments 1 and 4-44, wherein the Differential Scanning calorimetry (DSC) crystallization temperature of the olefin polymer produced by the process is from about 110° C. to about 135° C.

Embodiment 58. A process for polymerizing an olefin according to any of embodiments 1 and 4-44, wherein the olefin polymer is an ethylene homopolymer and the number-average molecular weight (Mn) of the olefin polymer produced by the process is from about 5,000 g/mol to about 250,000 g/mol, from about 10,000 g/mol to about 200,000 g/mol, or from about 20,000 g/mol to about 150,000 g/mol.

Embodiment 59. A process for polymerizing an olefin according to any of embodiments 1 and 4-44, wherein the olefin polymer is an ethylene homopolymer and the weight-average molecular weight (Mw) of the olefin polymer produced by the process is of from about 50,000 g/mol to about 700,000 g/mol, from about 75,000 g/mol to about 500,000 g/mol, or from about 100,000 g/mol to about 400,000 g/mol.

Embodiment 60. A process for polymerizing an olefin according to any of embodiments 1 and 4-44, wherein the olefin polymer is an ethylene homopolymer and the density of the olefin polymer produced by the process is from about 0.89 g/cm$^3$ to about 0.95 g/cm$^3$, from about 0.89 g/cm$^3$ to about 0.94 g/cm$^3$, or from about 0.90 g/cm$^3$ to about 0.93 g/cm$^3$.

Embodiment 61. A process for polymerizing an olefin according to any of embodiments 1, 4-44, and 46-49, wherein the melt index (MI) of the olefin polymer produced by the process is from about 0 g/10 min to about 20 g/10 min, from about 0.1 g/10 min to about 10 g/10 min, or from about 0.5 g/10 min to about 3 g/10 min.

Embodiment 62. A process for polymerizing an olefin according to any of embodiments 1 and 4-44, wherein the olefin polymer produced by the process is characterized by any one or any combination of more than one of the following properties:

a) a density from about 0.900 g/mL$^3$ to about 0.950 g/mL$^3$;
b) a weight-average molecular weight (Mw) from about 12,000 to about 600,000;
c) a number-average molecular weight (Mn) from about 10,000 to about 150,000;
d) a melting point from about 105° C. to about 135° C.;
e) a polydispersity (Mw/Mn) from about 2.0 to about 8.0;
f) a flow activation from about 20 kJ/mol to about 35 kJ/mol; and/or g) a number of short chain branches from 4 per 1,000 total carbons to 15 per 1,000 total carbons.

Embodiment 63. A process for polymerizing an olefin according to any of embodiments 1 and 4-44, wherein the olefin polymer produced by the process is characterized by any one or any combination of more than one of the following properties:
a) a density from about 0.905 g/mL$^3$ to about 0.945 g/mL$^3$;
b) a weight-average molecular weight (Mw) from about 50,000 to about 400,000;
c) a number-average molecular weight (Mn) from about 12,000 to about 150,000;
d) a melting point from about 110° C. to about 130° C.;
e) a polydispersity (Mw/Mn) from about 2.0 to about 7.0;
f) a flow activation from about 22 kJ/mol to about 32 kJ/mol; and/or
g) a number of short chain branches from 6 per 1,000 total carbons to 12 per 1,000 total carbons.

Embodiment 64. A process for polymerizing an olefin according to any of embodiments 1, 4-44, and 46-49, wherein the olefin polymer produced by the process is characterized by from about 1.5 wt % to about 5.5 wt % methyl branching, from about 0.2 wt % to about 2.5 wt % ethyl branching, and from about 0.1 wt % to about 1 wt % butyl branching.

Embodiment 65. A process for polymerizing an olefin according to any of embodiments 1, 4-44, and 46-49, wherein the olefin polymer produced by the process is characterized by from about 2.5 wt % to about 3.5 wt % methyl branching, from about 0.5 wt % to about 1.5 wt % ethyl branching, and from about 0.05 wt % to about 0.45 wt % butyl branching.

Embodiment 66. A process for polymerizing an olefin according to any of embodiments 1, 4-44, and 46-49, wherein the olefin polymer produced by the process is characterized by any one or any combination of more than one of the following properties:
a) from about 1.5 wt % to about 5.5 wt % methyl branching;
b) from about 0.2 wt % to about 2.5 wt % ethyl branching; and
c) from about 0.1 wt % to about 1 wt % butyl branching.

Embodiment 67. A process for polymerizing an olefin according to any of embodiments 1, 4-44, and 46-49, wherein the olefin polymer produced by the process is characterized by any one or any combination of more than one of the following properties:
a) from about 2.5 wt % to about 3.5 wt % methyl branching;
b) from about 0.5 wt % to about 1.5 wt % ethyl branching; and
c) from about 0.05 wt % to about 0.45 wt % butyl branching.

Embodiment 68. A process for polymerizing an olefin according to any of embodiments 1, 4-44, and 46-49, wherein the olefin polymer produced by the process is characterized by any one or any combination of more than one of the following properties:
a) a polydispersity (Mw/Mn) from about 2.5 to about 7.0;
b) a flow activation from about 22 kJ/mol to about 32 kJ/mol;
c) a number of short chain branches from 6 per 1,000 total carbons to 12 per 1,000 total carbons;
d) a dynamic viscosity $\eta_0$(Pa·s) from about $10^6$ Pa·s to about $10^8$ Pa·s at a weight average molecular weight (Mw, SEC) from about $2\times10^5$ to about $3\times10^5$; and/or
e) a zero shear viscosity $\eta_0$(Pa·s) of less than or about $10^7$ Pa·s at a weight average molecular weight (Mw, SEC) from about $2.25\times10^5$ to about $3.25\times10^5$.

Embodiment 69. A method for forming or preparing an article of manufacture comprising an olefin polymer, the method comprising:
a) performing the olefin polymerization process defined in any of embodiments 1, 4-36, and 38-41; and
b) fabricating the article of manufacture comprising the olefin polymer by any technique disclosed herein.

Embodiment 70. An article fabricated according to embodiment 69, wherein the article is an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

We claim:
1. A process for polymerizing an olefin, the process comprising:
a) providing a catalyst system comprising the contact product of:
1) one or more transition metal compounds, each having a formula according to formula (I):

wherein
M is Ni, Pd, or Pt;
$X^1$ and $X^2$ are each independently a monoanionic ligand, or $X^1$ and $X^2$ taken together is a bidentate dianionic ligand;
$R^1$ and $R^4$ are each independently $C_1$ to $C_{20}$ hydrocarbyl or substituted hydrocarbyl; and
$R^2$ and $R^3$ are each independently hydrogen, $C_1$ to $C_{20}$ hydrocarbyl or substituted hydrocarbyl, or $R^2$ and $R^3$ taken together is $C_2$ to $C_{20}$ hydrocarbylene or substituted hydrocarbylene to form a carbocyclic ring;
2) at least one first activator comprising an organoaluminum compound, an organozinc compound, an organomagnesium compound, an organolithium compound, an organoboron or organoborate compound, an ionizing ionic compound, an aluminoxane compound, or any combination thereof; and
3) a second activator comprising a solid oxide chemically-treated with an electron withdrawing anion selected from fluoride, chloride, bromide, iodide, trifluoroacetate, triflate, sulfate, bisulfate, fluoro sulfate, fluoroborate, fluorozirconate, fluorotitanate, or any combination thereof; and
b) contacting the catalyst system with at least one olefin monomer consisting essentially of ethylene under polymerization conditions suitable to form a polyethylene, wherein the polymerization conditions comprise an ethylene pressure of from 15 psig to 1,500 psig, and wherein the polyethylene is characterized by the following properties: (i) from 1.5 wt % to 5.5 wt % methyl branching; (ii) from 0.2 wt % to 2.5 wt % ethyl branching; and (iii) from 0.1 wt % to 1 wt % butyl branching.

2. The process according to claim 1, wherein $R^1$ and $R^4$ are each independently an aryl or substituted aryl.

3. The process according to claim 1, wherein $R^2$ and $R^3$ taken together is $C_6$ to $C_{20}$ hydrocarbylene or substituted hydrocarbylene to form a carbocyclic ring.

4. The process according to claim 1, wherein $R^2$ and $R^3$ taken together is a substituted or unsubstituted group having the formula:

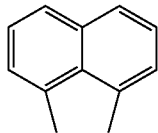

5. The process according to claim 1, wherein $R^1$ and $R^4$ are different.

6. The process according to claim 1, wherein $R^1$ and $R^4$ are the same.

7. The process according to claim 1, wherein the

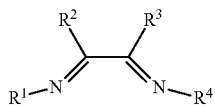

ligand of the one or more transition metal compounds is

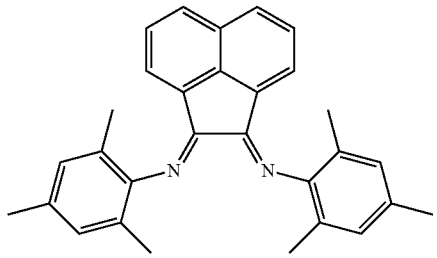

,

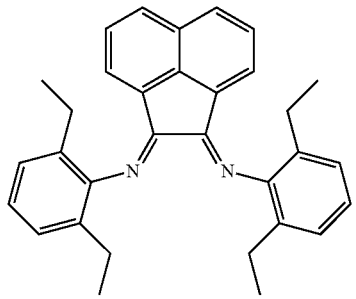

,

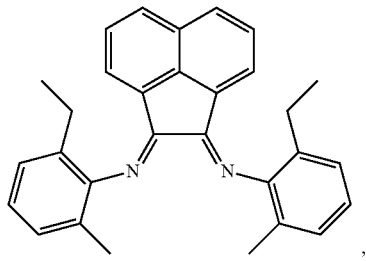

,

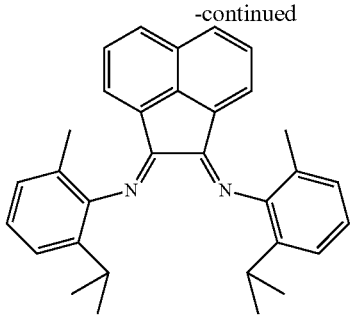

,

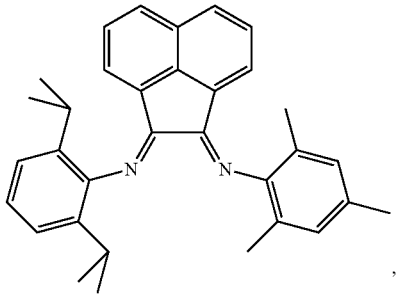

,

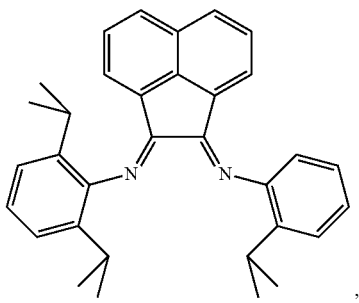

,

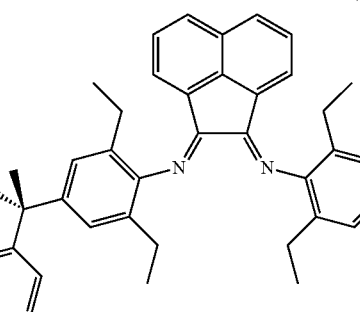

,

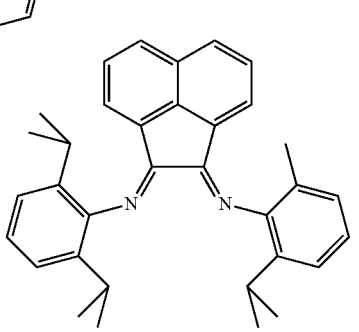

, or any combination thereof.

8. The process according to claim 1, wherein:
a) $X^1$ and $X^2$ are each independently halide, hydride, $C_1$ to $C_{20}$ hydrocarbyl or $C_1$ to $C_{20}$ hydrocarbyloxide, or $X^1$ and $X^2$ taken together is $C_1$ to $C_{20}$ hydrocarbylene-dioxide;

b) $X^1$ and $X^2$ are each independently chloride, bromide, iodide, hydride, $C_1$ to $C_{20}$ hydrocarbyl, or $C_1$ to $C_{20}$ hydrocarbyloxide;

c) $X^1$ and $X^2$ are each independently chloride, bromide, hydride, or $C_1$-$C_4$ alkoxide; or d) $X^1$ and $X^2$ taken together is lactate, glycolate, salicylate, catecholate, oxalate or malonate.

9. The process according to claim 1, wherein the one or more transition metal comnpounds is

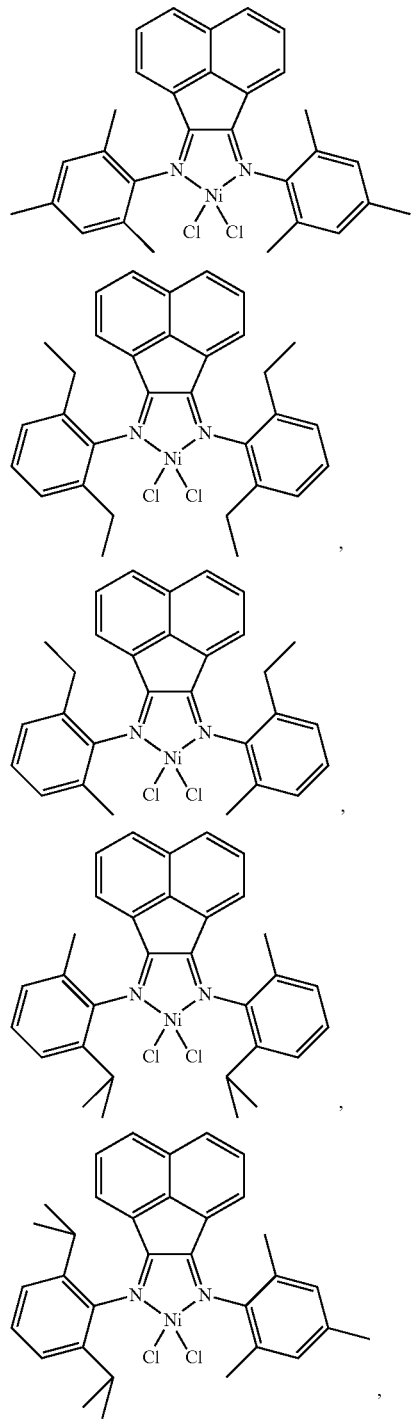

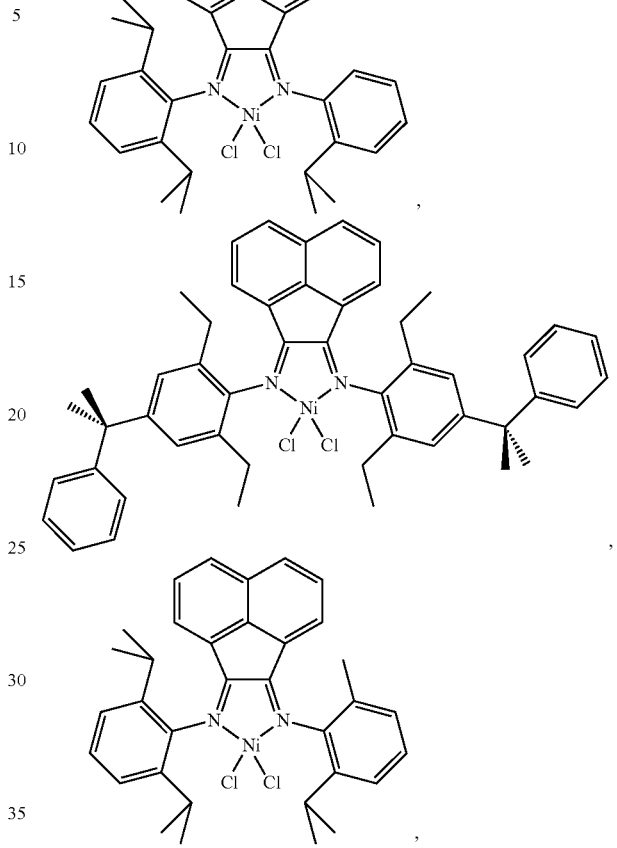

or any combination thereof.

10. The process according to claim 1, wherein:
a) the first activator has a general formula:
i) $M^1(X^3)_n(X^4)_{3-n}$, wherein $M^1$ is boron or aluminum and n is from 1 to 3 inclusive;
ii) $M^2(X^3)_n(X^4)_{2-n}$, wherein $M^2$ is magnesium or zinc and n is from 1 to 2 inclusive; or
iii) $M^3X^3$, wherein $M^3$ is Li;
b) $X^3$ is independently hydride or a $C_1$ to $C_{20}$ hydrocarbyl; and
c) $X^4$ is independently a halide, a hydride, a $C_1$ to $C_{20}$ hydrocarbyl, or a $C_1$ to $C_{20}$ hydrocarbyloxide.

11. The process according to claim 1, wherein the first activator comprises an organoaluminum compound and wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

12. The process according to claim 1, wherein the solid oxide of the second activator is silica, alumina, silica-alumina, aluminum phosphate, mullite, boehmite, heteropolytungstates, titania, zirconia, magnesia, boria, zinc oxide, silica-zirconia, silica-titania, or any mixed oxides thereof, or any combination thereof; or alternatively, silica-alumina, mullite, silica-zirconia, silica-titania, or any combination thereof.

13. The process according to claim 1, wherein the electron withdrawing anion of the second activator is fluoride, chloride, trifluoroacetate, triflate, sulfate, bisulfate, fluoro sulfate, or any combination thereof.

14. The process according to claim 1, wherein the solid oxide chemically-treated with an electron withdrawing anion is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided mullite, chlorided mullite, bromided mullite, sulfated mullite, or any combination thereof.

15. The process according to claim 1, wherein the solid oxide chemically-treated with an electron withdrawing anion has one or more than one of the following properties: a) a surface area from 100 $m^2/g$ to 1000 $m^2/g$; b) a pore volume from 0.25 mL/g to 3.0 mL/g; and c) and a particle size from 5 microns to 150 microns.

16. The process according to claim 1, wherein the at least one olefin monomer and the catalyst system are contacted under at least one of the following conditions:
 a) the molar ratio of the first activator to the one or more transition metal compounds is from 20:1 to 500:1;
 b) the weight ratio of the second activator to the one or more transition metal compounds is from 5:1 to 1,000:1; and
 c) the weight ratio of the at least one olefin monomer to the one or more transition metal compounds is from 1,000:1 to 100,000,000:1.

17. The process according to claim 1, wherein the polymerization conditions comprise contacting the catalyst system with at least one olefin monomer in the presence of a diluent comprising propane, iso-butane, n-pentane, iso-pentane, heptane, hexane or a combination thereof.

18. The process according to claim 1, wherein the polymerization process is conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof.

19. The process according to claim 1, wherein the polymerization conditions suitable to form the polyethylene comprise a polymerization reaction temperature from 50° C. to 120° C. and a reaction pressure from 100 psig to 1000 psig (1.4 to 6.9 MPa).

20. The process according to claim 1, wherein the polyethylene has at least one of the following properties:
 a) a number-average molecular weight (Mn) from 5,000 g/mol to 250,000 g/mol;
 b) a weight-average molecular weight (Mw) of from 50,000 g/mol to 700,000 g/mol;
 c) a density from 0.89 $g/cm^3$ to 0.95 $g/cm^3$; and
 d) a melt index (MI) from 0 g/10 min to 20 g/10 min.

21. The process according to claim 1, wherein the polyethylene produced by the process is characterized by at least one of the following properties:
 a) a density from 0.905 $g/mL^3$ to 0.940 $g/mL^3$;
 b) a weight-average molecular weight (Mw) from 150,000 to 400,000;
 c) a number-average molecular weight (Mn) from 20,000 to 150,000;
 d) a melting point from 115° C. to 135° C.;
 e) a polydispersity (Mw/Mn) from 2.0 to 7.0;
 f) a flow activation from 22 kJ/mol to 32 kJ/mol;
 g) from 2.5 wt % to 3.5 wt % methyl branching;
 h) from 0.5 wt % to 1.5 wt % ethyl branching; and
 i) from 0.05 wt % to 0.45 wt % butyl branching.

22. The process according to claim 1, wherein the polyethylene produced by the process is characterized by the following properties:
 a) from 2.5 wt % to 3.5 wt % methyl branching;
 b) from 0.5 wt % to 1.5 wt % ethyl branching; and
 c) from 0.05 wt % to 0.45 wt % butyl branching.

23. The process according to claim 1, wherein the polymerization conditions suitable to form the polyethylene comprise an ethylene pressure of from 30 psig to 1,000 psig.

24. The process according to claim 23, wherein the polymerization conditions suitable to form the polyethylene further comprise a temperature range from 65° C. to 120° C.

25. The process according to claim 1, wherein the polymerization conditions suitable to form the polyethylene comprise an ethylene pressure of from 45 psig to 1,000 psig.

26. The process according to claim 25, wherein the polymerization conditions suitable to form the polyethylene further comprise a temperature range from 70° C. to 120° C.

27. The process according to claim 1, wherein the polymerization conditions suitable to form the polyethylene comprise an ethylene pressure of from 200 psig to 1,000 psig and a temperature range from 60° C. to 120° C.

28. The process according to claim 1, wherein the polymerization conditions suitable to form the polyethylene comprise an ethylene pressure of from 100 psig to 600 psig.

29. The process according to claim 1, wherein the polymerization conditions suitable to form the polyethylene further comprise a temperature range from 40° C. to 120° C.

30. A method for forming or preparing an article of manufacture comprising an olefin polymer, the method comprising:
 a) performing the olefin polymerization process defined in claim 1; and
 b) fabricating the article of manufacture comprising the olefin polymer by any technique disclosed herein,
 wherein the article is an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

* * * * *